(12) United States Patent
Lehr et al.

(10) Patent No.: US 7,183,409 B2
(45) Date of Patent: Feb. 27, 2007

(54) BASIC MONO- AND BISAZO COMPOUNDS

(75) Inventors: Friedrich Lehr, Efringen-Kirchen (DE); Reinhard Pedrazzi, Allschwil (CH); Heidrun Schene, Lörrach (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 10/479,779

(22) PCT Filed: May 29, 2002

(86) PCT No.: PCT/IB02/01951

§ 371 (c)(1),
(2), (4) Date: Nov. 25, 2003

(87) PCT Pub. No.: WO02/096994

PCT Pub. Date: Dec. 5, 2002

(65) Prior Publication Data

US 2004/0158049 A1   Aug. 12, 2004

(30) Foreign Application Priority Data

Jun. 1, 2001   (GB) .................. 0113307.3

(51) Int. Cl.
C09B 62/006 (2006.01)
C07D 251/26 (2006.01)

(52) U.S. Cl. .................. 544/211; 534/604; 534/803; 8/662

(58) Field of Classification Search ............... 544/194, 544/196, 197, 198, 211; 534/604, 605, 798, 534/803; 8/657, 658, 919, 662; 106/31.48
See application file for complete search history.

(56) References Cited

U.S. PATENT DOCUMENTS

| | | | |
|---|---|---|---|
| 2,780,619 A * | 2/1957 | Durig et al. ............. 534/664 |
| 4,023,924 A | 5/1977 | Frei et al. | |
| 4,149,851 A | 4/1979 | Frei et al. | |
| 4,273,707 A | 6/1981 | Pedrazzi | |
| 4,363,761 A * | 12/1982 | Pedrazzi ............. 534/803 |
| 4,367,172 A * | 1/1983 | Pedrazzi ............. 534/797 |
| 4,544,737 A * | 10/1985 | Stohr et al. ............. 534/605 |
| 4,594,410 A | 6/1986 | Pedrazzi | |
| 4,670,547 A | 6/1987 | Lehr | |
| 4,742,160 A | 5/1988 | Dore et al. | |
| 4,764,175 A | 8/1988 | Dore et al. | |
| 4,840,642 A | 6/1989 | Auerbach et al. | |
| 5,386,015 A | 1/1995 | Doswald et al. | |
| 5,498,701 A * | 3/1996 | Pedrazzi ............. 534/797 |
| 5,578,712 A | 11/1996 | Doerr et al. | |
| 5,654,410 A | 8/1997 | Nusser et al. | |
| 5,677,433 A * | 10/1997 | Taylor ............. 534/605 |
| 5,747,657 A | 5/1998 | Lehr | |
| 5,929,215 A * | 7/1999 | Pedrazzi ............. 534/604 |
| 6,127,531 A | 10/2000 | Nusser | |
| 6,365,719 B1 | 4/2002 | Lehr | |

FOREIGN PATENT DOCUMENTS

FR   2512041   3/1983
WO   WO 97/35925   10/1999

* cited by examiner

Primary Examiner—Joseph K. McKane
Assistant Examiner—Janet L. Coppins
(74) Attorney, Agent, or Firm—Tod A. Waldrop

(57) ABSTRACT

The invention relates to basic mono- and bisazo compounds according to formula (I)

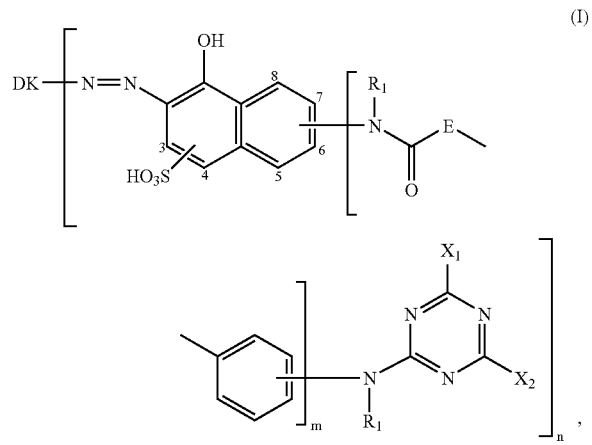

wherein all substituents are defined as in Claim 1, their production, their use as dyestuffs as well as material dyed with these dyestuffs.

7 Claims, No Drawings

BASIC MONO- AND BISAZO COMPOUNDS

The invention relates to basic mono- and bisazo compounds, salts thereof and mixtures of these compounds, which may be in internal or external, salt form. They are suitable for use as dyestuffs.

U.S. Pat. No. 4,764,175 provides monoazo and disazo compounds having a 1-hydroxy-5,6-, 7- or 8-substituted 1,3,5-triazinylamino-3- or 4 sulfonic acid coupling component radical.

However there is still a need to produce dyes having improved properties. Surprisingly, it was found that dyes according to formula (I) as shown below of the present application have those desired properties.

According to the invention there are provided compounds of formula (I)

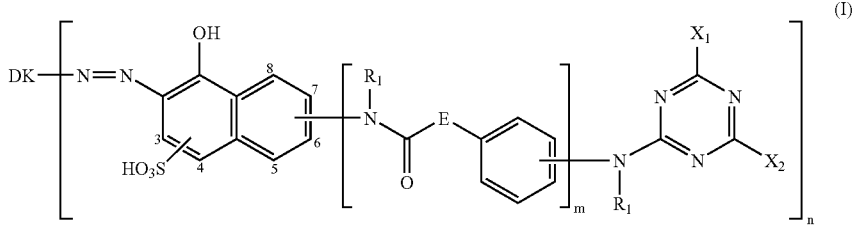

wherein $R_1$ is H; $C_1$–$C_4$alkyl or $C_1$–$C_4$alkyl monosubstituted by —OH, $X_1$ and $X_2$ independently of each other are an aliphatic, cycloaliphatic, aromatic or heterocyclic amino group, and at least one amino group comprises a protonatable nitrogen atom or a quaternary ammonium group, and being an aliphatic, cycloaliphatic, aromatic or heterocyclic mono($C_{1-4}$alkyl)-amino group, the $C_{1-4}$alkyl-group being unsubstituted or monosubstituted by halogen, $C_{1-4}$alkoxy, $C_{1-4}$alkyl, phenyl or hydroxy; an aliphatic, cycloaliphatic, aromatic or heterocyclic di($C_{1-4}$alkyl)-amino group, the $C_{1-4}$alkyl-groups being independently unsubstituted or monosubstituted by halogen, $C_{1-4}$alkyl, $C_{1-4}$alkoxy, phenyl or hydroxy; a $C_{5-6}$cycloalkylamino group, the cycloalkyl group being unsubstituted or substituted by one or two $C_{1-2}$alkyl groups; a phenylamino group, the phenyl ring being unsubstituted or substituted by one or two groups selected from halogen, $C_{1-4}$alkyl, $C_{1-4}$alkoxy, hydroxy and phenoxy; or a 5- or 6-membered ring containing one or two hetero atoms, in addition to N, O or S, which heterocyclic ring is unsubstituted or substituted by one or two $C_{1-4}$alkyl groups; or a group Z, where Z is independently selected from

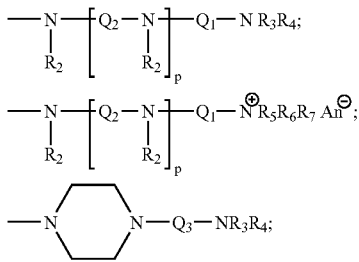

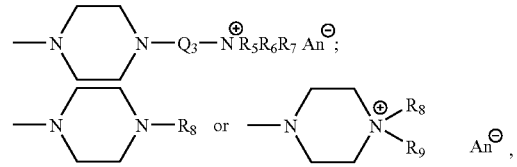

where
p is 0 or an integer 1, 2 or 3,
each $R_2$ is independently H; unsubstituted $C_{1-4}$alkyl or $C_{1-4}$alkyl monosubstituted by hydroxy, halogen, cyano or $C_{1-4}$alkoxy, each $R_3$ and $R_4$ is independently H; unsubstituted $C_{1-6}$alkyl; $C_{2-6}$alkyl monosubstituted by hydroxy or cyano; phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-6}$cycloalkyl substituted by one to three $C_{1-4}$alkyl groups, or a pyridinium ring, or $R_3$ and $R_4$ together with the nitrogen atom to which they are attached, form a 5- or 6-membered ring containing one to three hetero atoms (in addition to N, one or two further N, O or S), which heterocyclic ring is unsubstituted or substituted by one or two $C_{1-4}$alkyl groups, each $R_5$ and $R_6$ has independently one of significances of $R_3$ and $R_4$, except hydrogen, $R_7$ is $C_{1-4}$alkyl or benzyl with the exception that $R_7$ is not benzyl when $R_5$ and $R_6$ have one of the cyclic significations of $R_3$ and $R_4$ or $R_5$, $R_6$ and $R_7$ together with the nitrogen atom to which they are attached, form a pyridinium ring which is unsubstituted or substituted by one or two methyl groups, $Q_1$ is $C_{2-8}$alkylene; branched $C_{2-8}$alkylene; $C_{2-6}$alkylene substituted by one or two hydroxy groups; $C_{1-6}$alkylene-1,3-phenylene; or $C_{1-6}$alkylene-1,4-phenylene, $Q_2$ is $C_{2-8}$alkylene; branched $C_{2-8}$alkylene; $C_{3-6}$alkylene substituted by one or two hydroxy groups; $C_{1-16}$alkylene-1,3-phenylene; $C_{1-6}$alkylene-1,4-phenylene; 1,3-phenylene or 1,4-phenylene, $Q_3$ is $C_{2-8}$alkylene, $R_8$ is H; unsubstituted $C_{1-6}$alkyl or $C_{1-6}$alkyl monosubstituted by hydroxy, cyano, chlorine or phenyl, $R_9$ is unsubstituted $C_{1-6}$alkyl or $C_{1-6}$alkyl monosubstituted by hydroxy, cyano or chlorine, and $An^{\ominus}$ is a non-chromophoric anion, E is NH or a direct bond, m is 0 or 1, and if m is 1 the phenyl group is substituted meta or para, n is 1 or 2 with the provisos that (i) when n is 1 then DK is a radical of formula (a)

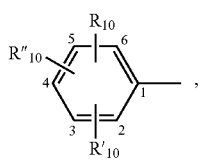
(a)

wherein $R_{10}$ is $SO_2$—Y or —O—Y, where Y is a $C_{2-4}$-alkenyl group or a $C_{2-4}$alkyl group which is optionally substituted by —CN, —OH, —OSO$_3$H, halogen or —NR$_{11}$R$_{12}$, wherein R$_{11}$, and R$_{12}$ are independently from one another H, $C_{1-4}$alkyl or substituted $C_{1-4}$alkyl, or R$_{11}$ and R$_{12}$ together with the nitrogen atom to which they are attached, form a 5- or 6-membered ring containing one to three hetero atoms (in addition to N, one or two further N, O or S), which heterocyclic ring is unsubstituted or substituted by one or two $C_{1-4}$alkyl groups preferably, $R'_{10}$ and $R''_{10}$ are independently from one another H; $C_{1-2}$alkyl; $OC_{1-2}$alkyl; —SO$_3$H; —OH or —CN;

or DK is a radical of formula (b)

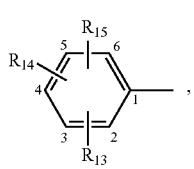
(b)

wherein $R_{13}$ is H; $C_{1-4}$alkyl; substituted $C_{1-4}$alkyl; O—$C_{1-4}$alkyl; substituted O—$C_{1-4}$alkyl; —SO$_3$H; —OH; —CN; —COOR$_{11}$; —NR$_{11}$R$_{12}$ or halogen, wherein R$_{11}$ and R$_{12}$ have the same meanings as defined above, $R_{14}$ and $R_{15}$ have the same definition as $R_{13}$ with exception of hydrogen, wherein at least one of the $R_{13}$, $R_{14}$ or $R_{15}$ is —SO$_3$H;

or DK can be a bicyclic ringsystem wherein each ring is independently from each other a 5- or 6- membered ring and the bicyclic ringsystem is not substituted by further azo groups and (ii) when n is 2 then DK is a divalent radical B, as well as their salts and/or mixtures thereof.

The compounds can be in internal or external salt form.

Any alkyl or alkylene present is linear or branched unless indicated to the contrary. In any hydroxy- or alkoxy-substituted alkyl or alkylene group, which is linked to a nitrogen atom, the hydroxy or alkoxy group is bound to a carbon atom other than to the $C_1$-atom. In any alkylene group substituted by two hydroxy groups, the hydroxy groups are bound to different carbon atoms.

It is preferred that the substituted triazinyl radical is attached to the naphthol radical at the 6 or 7 position.

If m is 1 the preferred substitution of the phenylene group of the [—N(R$_1$)—C(O)-E-phenylene-]-group is meta.

It is also preferred that the sulphonic acid group is attached at the 3-position of the naphthol radical.

When DK is a bicyclic ringsystem then each ring can comprise one or more heteroatom, preferably N, O and/or S. Each ring can be aromatic or aliphatic. Each ring can be substituted.

Any alkyl as $R_1$ preferably contains 1 or 2 carbon atoms, and is more preferably methyl. Any alkyl monosubstituted by hydroxy is preferably linear or branched $C_{1-3}$alkyl.

$R_1$ is preferably $R_{1a}$, where each $R_{1a}$ is independently hydrogen; methyl; ethyl or 2-hydroxy-ethyl.

Where $X_1$ or $X_2$ is an aliphatic amino group, such group is preferably a mono($C_{1-4}$alkyl)- or di($C_{1-4}$alkyl)-amino group in which each alkyl group is independently unsubstituted or monosubstituted by halogen (particularly chlorine or bromine), $C_{1-4}$alkoxy, phenyl or hydroxy, of which substituents hydroxy is most preferred. Any cycloaliphatic amino group as $X_1$ or $X_2$ is preferably a $C_{5-6}$cycloalkyl-amino group in which the cycloalkyl group is unsubstituted or substituted by one or two $C_{1-2}$alkyl groups.

Where $X_1$ or $X_2$ is an aromatic amino group, such group is preferably a phenylamino group in which the phenyl ring is unsubstituted or substituted by one or two groups selected from halogen (more preferably chlorine), $C_{1-4}$alkyl, $C_{1-4}$alkoxy, hydroxy and phenoxy.

Where $X_1$ or $X_2$ is a heterocyclic amino group, it is preferably a saturated 5- or 6-membered ring containing one or two hetero atoms (that is in addition to N, O or S), which heterocyclic ring is unsubstituted or substituted by one or two $C_{1-4}$alkyl groups. More preferably it is a piperidino- or morpholino-group.

Any unsubstituted $C_{1-6}$alkyl group as $R_3$ or $R_4$ is preferably methyl or ethyl. Any substituted $C_{2-6}$alkyl group as $R_3$ or $R_4$ is preferably ethyl or propyl monosubstituted by cyano or hydroxy with the substituent in the 2- or 3-position.

Any phenyl as $R_3$ or $R_4$ is preferably unsubstituted. Any phenylalkyl group is preferably benzyl, the phenyl ring of which is preferably unsubstituted. Any cycloalkyl as $R_3$ or $R_4$ is preferably cyclohexyl; any alkylsubstituted cycloalkyl is preferably cyclohexyl substituted by one to three methyl groups.

$R_3$ or $R_4$ are preferably $R_{3a}$ or $R_{4a}$, where each $R_{3a}$ or $R_{4a}$ is independently hydrogen; unsubstituted $C_{1-4}$alkyl; linear hydroxy-$C_{2-3}$alkyl; phenyl; benzyl or a pyridinium ring.

More preferably, $R_3$ or $R_4$ are $R_{3b}$ or $R_{4b}$, where each $R_{3b}$ or $R_{4b}$ is independently hydrogen; unsubstituted $C_{1-4}$alkyl; 2-hydroxethyl or a pyridinium ring.

Most preferably, $R_3$ and $R_4$ are $R_{3c}$ and $R_{4c}$ respectively, where each $R_{3c}$ and $R_{4c}$, is independently hydrogen; methyl or ethyl.

It is particularly preferred that $R_3$ and $R_4$ having a non-cyclic significance are identical groups.

$R_5$ and $R_6$ are preferably $R_{5a}$ and $R_{6a}$ respectively, where each $R_{5a}$ and $R_{6a}$ is independently unsubstituted $C_{1-4}$alkyl; linear hydroxy-$C_{2-3}$alkyl or benzoyl, or $R_{5a}$ and $R_{6a}$ together with the nitrogen to which they are attached form a piperidine-, morpholine-, piperazine- or N-methyl-piperazine-ring.

More preferably, $R_5$ and $R_6$ are $R_{5b}$ and $R_{6b}$ respectively where each $R_{5b}$ and $R_{6b}$ is independently unsubstituted $C_{1-4}$alkyl or 2-hydroxy-ethyl.

Any alkyl as $R_7$ is preferably methyl or ethyl, especially methyl.

In a preferred embodiment of the invention, Z above has the meaning $Z_a$, wherein each $Z_a$ is independently a group selected from

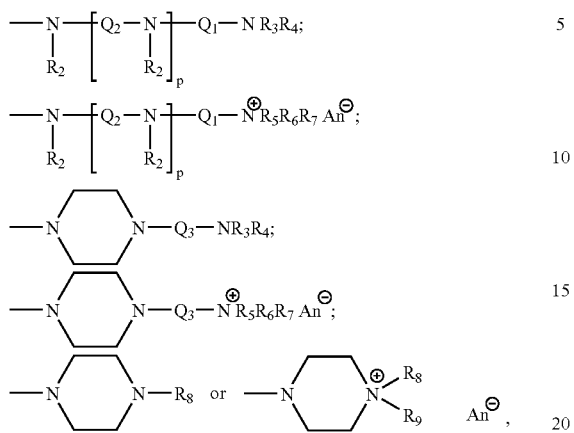

in which p' is 0 or 1, $R_{2b}$ is H; methyl or 2-hydroxyethyl, $Q_{1b}$ is unsubstituted $C_{2-6}$alkylene; monohydroxy-substituted $C_{3-4}$alkylene; —(CH$_2$)$_{1-4}$-1,3-phenylene; —(CH$_2$)$_{1-4}$-1,4-phenylene; 1,3-phenylene or 1,4-phenylene, each $Q_{2b}$ and $Q_{3b}$ is a linear $C_{2-6}$alkylene group, each $R_{3b}$ and $R_{4b}$ is independently H; unsubstituted $C_{1-4}$alkyl or 2-hydroxy-ethyl, or a pyridinium ring, each $R_{5b}$ and $R_{6b}$ is independently unsubstituted $C_{1-4}$alkyl or 2-hydroxy-ethyl, $R_{7b}$ is $C_{1-4}$alkyl or benzyl or $R_{5b}$, $R_{6b}$ and $R_{7b}$ together with the nitrogen to which they are attached form a pyridinium ring which is unsubstituted or substituted by one or two methyl groups, $R_{8b}$ is H; methyl; ethyl or 2-hydroxyethyl, $R_{9b}$ is methyl; ethyl or 2-hydroxyethyl, $R_{10}$ is in position 4, and $An^\ominus$ is a non-chromophoric anion.

In preferred compounds of the invention $R_{10}$ is a —SO$_2$—Y or —O—Y radical, wherein Y is a $C_{2-4}$-alkyl group which is monosubstituted by —Cl, —OH or —OSO$_3$H.

In preferred compounds of the invention $R_{10}$ is in position 4.

In further preferred compounds of the invention $R_{10}$ is a —SO$_2$—Y or —O—Y radical, wherein Y is a $C_{2-4}$-alkyl group which is monosubstituted by —NR$_{11}$R$_{12}$, wherein $R_{11}$ and $R_{12}$ together with the nitrogen atom to which they are attached, form a 5- or 6-membered ring containing one to three hetero atoms (in addition to N, one or two further N or O), which heterocyclic ring is unsubstituted.

In further preferred compounds of the invention $R_{13}$ is H; —CH$_3$ or —OCH$_3$.

In further preferred compounds of the invention $R_{14}$ and $R_{15}$ are independently from one another —CH$_3$; —CH$_2$CH$_3$; —OCH$_3$; —OCH$_2$CH$_3$ or —SO$_3$H.

Preferred bicyclic ringsystems have the following formulae (c)–(i)

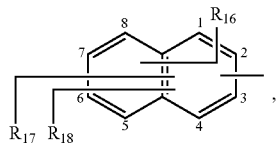

wherein $R_{16}$, $R_{17}$ and $R_{18}$ are independently from each other H; —SO$_3$H; —OH; —NR$_{11}$R$_{12}$, wherein $R_{11}$ and $R_{12}$ have the same meanings as defined above;

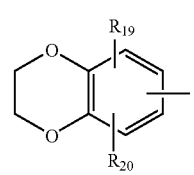

wherein $R_{19}$ and $R_{20}$ are independently from each other H; —OH; halogen; $C_{1-2}$alkyl or O—$C_{1-2}$alkyl;

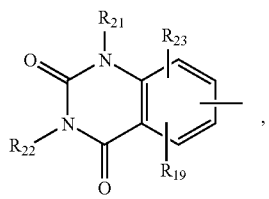

wherein $R_{21}$ and $R_{22}$ are independently of one another are H; $C_{1-4}$-alkyl; phenyl or a substituted phenyl group having 1 to 5 substituents selected from the group consisting of $C_{1-4}$-alkyl, $C_{1-4}$-alkoxy, halogen, nitro, cyano, hydroxyl, CF$_3$, CONH$_2$, CONH(C$_{5-6}$-cycloalkyl), CON(C$_{1-4}$-alkyl)$_2$, CONH(C$_{1-4}$)-alkyl, COO(C$_{1-4}$)-alkyl, COO(C$_{5-6}$-cycloalkyl) and CONH(phenyl), $R_{23}$ is H; a trifluoromethyl group; a halogen atom; $C_{1-4}$-alkyl; $C_{1-4}$-alkoxy; a nitro or a cyano group $R_{19}$ is as defined above;

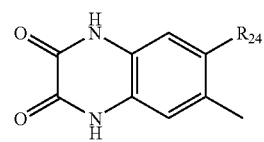

wherein $R_{24}$ is H; methyl; methoxy; ethoxy; chloro or bromo;

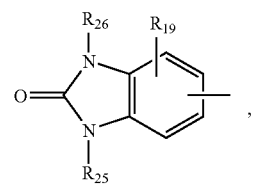

wherein R$_{25}$ and R$_{26}$ are independently from each other H; C$_{1-4}$alkyl or substituted C$_{1-4}$alkyl, R$_{19}$ is as defined above;

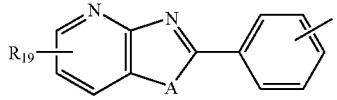

(h)

wherein A is S or O and R$_{19}$ is as defined above;

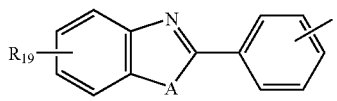

(i)

wherein A is S or O and R$_{19}$ is as defined above.

as well as their salts and mixtures thereof.

Preferably the —N═N— group is in formula (h) and (i) in the para-position.

In further preferred compounds of the present invention, when n is 2 and B is one of the following divalent radicals

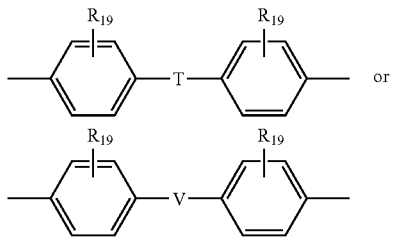

wherein each T is independently from one another a direct bond; a C$_{1-4}$alkylene group; a substituted C$_{1-4}$alkylene group; a C$_{2-4}$alkenylene group or a substituted C$_{2-4}$alkenylene group, V is one of the following radicals

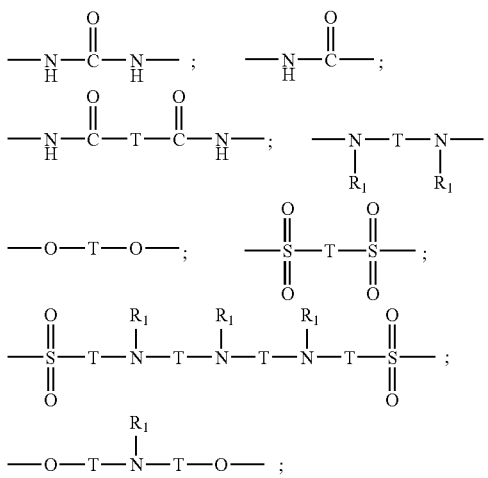

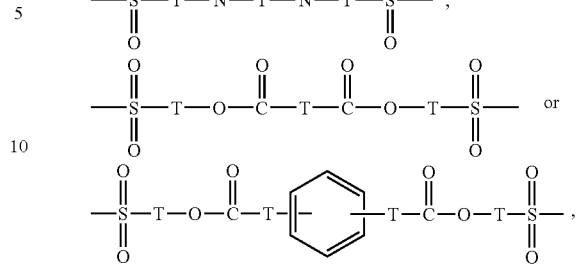

each R$_1$ and each R$_{19}$ and each T has the meanings as defined above.

Especially preferred compounds according to the present invention have the following formula

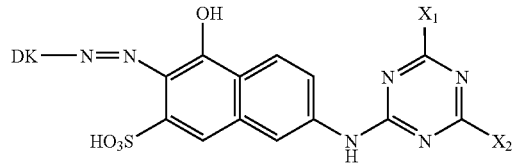

wherein DK is one of the radicals (a) to (i) as defined above wherein

R$_{10}$ is SO$_2$Y or —O—Y wherein Y is a C$_{2-4}$ alkyl group which is substituted by —OH or Y is a C$_{2-4}$-alkyl group which is monosubstituted by —NR$_{11}$R$_{12}$, wherein R$_{11}$ and R$_{12}$ together with the nitrogen atom to which they are attached, form a 5- or 6-membered ring containing one or two hetero atoms (in addition to N, one further N or O), which heterocyclic ring is unsubstituted.

R'$_{10}$ and R"$_{10}$ are independently from one another H; C$_{1-2}$alkyl or OC$_{1-2}$alkyl, R$_{11}$ and R$_{12}$ independently from each other are H; —CH$_3$ or —CH$_2$CH$_3$, R$_{13}$ is H; —CH$_3$ or OCH$_3$, R$_{14}$ and R$_{15}$ are independently from each other are —CH$_3$; —CH$_2$CH$_3$; —OCH$_3$; —OCH$_2$CH$_3$ or —SO$_3$H, R$_{16}$, R$_{17}$ and R$_{18}$ are independently from each other H; —NH$_2$; —OH or —SO$_3$H, R$_{19}$ and R$_{20}$ are independently from each other H; —CH$_3$ or —OCH$_3$, R$_{21}$ and R$_{22}$ are independently from each other H; —CH$_3$ or —CH$_2$CH$_3$, R$_{23}$ is H; —CH$_3$ or —CH$_2$CH$_3$, R$_{24}$ is H; —CH$_3$ or —OCH$_3$, R$_{25}$ and R$_{26}$ are independently from each other H; —CH$_3$ or —CH$_2$CH$_3$, X$_1$ and X$_2$ are independently from each other a group Z$_a$ as defined above.

Further especially preferred compounds according to the present invention have the following formula

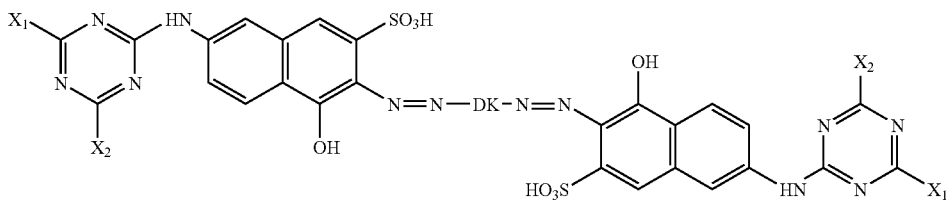

wherein DK is a divalent radical B which can be chosen from the group consisting of

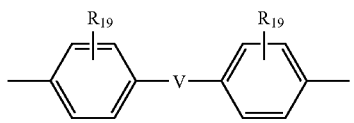

where V is one of the following radicals

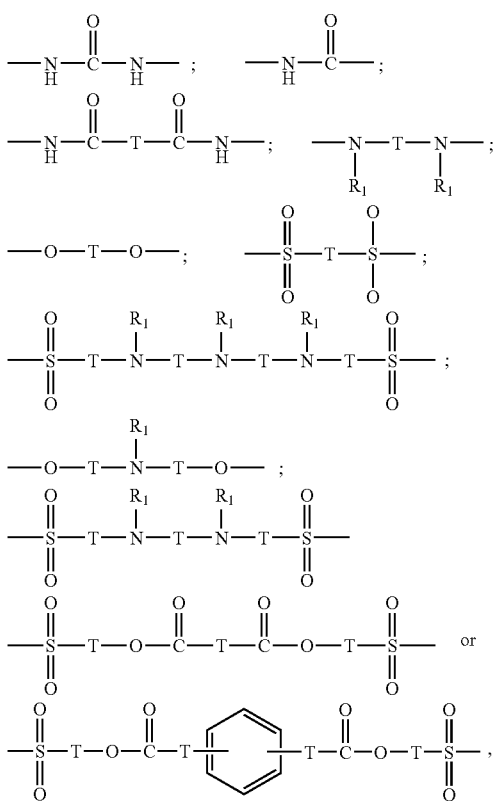

each $R_1$ and each $R_{19}$ has the meanings as defined above and wherein each T is independently from one another a direct bond; a $C_{1-4}$alkylene group; a substituted $C_{1-4}$alkylene group; a $C_{2-4}$alkenylene group or a substituted $C_{2-4}$alkenylene group, as defined above, and $X_1$ and $X_2$ are independently from each other a group $Z_a$ as defined above.

The present invention further provides a process for the preparation of compounds of formula (I) comprising reacting the diazonium salt of an amine of formula (II), <p style="text-align:center">DK—NH$_2$      (II)</p> in which DK is as above defined and preferably being so positioned as above defined, so as to give a preferred compound of formula (I) as above disclosed, with a compound of formula (III),

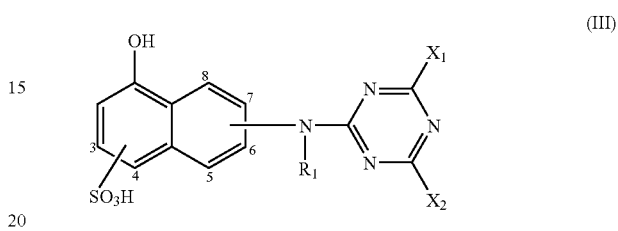

in which $R_1$, $X_1$, and $X_2$ are as above defined.

When DK is B, the mole concentration of compound (III) has to be at least twice the mole concentration of compound (II).

Diazotisation and coupling may be effected in accordance with conventional methods. The coupling reaction advantageously is carried out in an aqueous reaction medium in a temperature range of from 0–60° C., preferably at 20–50° C., and in a pH range of from 3 to 9, preferably at pH 4 to 6. All temperatures are given in degrees Celsius.

The reaction mixtures comprising compounds of formula (I) thus obtained may be converted into stable liquid formulations with improved long term stability by desalting by ultra filtration.

The compounds of formula (I) thus obtained may be isolated in accordance with known methods.

The compounds of formula (I) containing free basic groups may be converted wholly or in part into water-soluble salts by reacting with any inorganic or organic acids for example with lactic acid, or acetic acid, or formic acid, or with hydrochloric acid, or with sulfuric acid.

The starting compounds, the amines of formula (II), are either known or may be prepared in accordance with known methods from available starting materials. The compounds of formula (III) may be prepared by step-wise replacement of the chlorine atoms of cyanuric chloride whereby in a first and second step, cyanuric chloride is reacted with a diamine of formulae (IV) and (V) (as hereinafter defined), respectively,

in which $R_{2b}$ is as above defined and Q and X have the following meanings: Q may have any of the meanings of $Q_1$, $Q_2$ or $Q_3$ above; and X has the meaning of $X_1$.

In the case where identical diamino groups have to be introduced, this first and second step may be combined into one step. Suitably, the single step is carried out at temperatures of from 0–30° C. and preferably at pH 4–6.

Where different diamino groups have to be introduced, suitably, the diamine showing the higher selectivity with respect to the condensation reaction is introduced in the first step at a temperature of preferably 0–20° C. more preferably 0–5° C. Both condensation steps may be carried out using the conventional reaction medium where the upper limit of pH is 7. The second step is preferably carried out at 10–40° C., more preferably 12–30° C.

The final third step, the condensation with the aminonaphthol component, is carried out at elevated temperatures in the range of 60–100° C. and at pH 2–3.

The starting compounds of formulae (IV) and (V) are either known or may be prepared in accordance with known methods from available starting materials.

The compounds according to the invention, in acid addition salt form or quaternary ammonium salt form, may be used for dyeing cationic dyeable materials such as: homo- or mixed-polymers of acrylonitrile, acid modified polyester or polyamide; wool; leather including low affinity vegetable-tanned leather; cotton; bast fibers such as hemp, flax, sisal, jute, coir and straw; regenerated cellulose fibers, glass or glass products comprising glass fibers; and substrates comprising cellulose for example paper and cotton. They may also be used for printing fibers, filaments and textiles comprising any of the above mentioned materials in accordance with known methods. Printing may be effected by impregnation of the material to be printed with a suitable printing paste comprising one or more compounds of the present invention. The type of printing paste employed, may vary depending on the material to be printed. Choice of a suitable commercially available printing paste or production of a suitable paste, is routine for one skilled in the art. Alternatively the compounds of the present invention may be used in the preparation of inks suitable for example for jet printing, in accordance with conventional methods.

Most preferably, the dyestuffs are used for dyeing or printing of paper e.g., sized or unsized, wood-free or wood-containing paper or paper-based products such as cardboard. They may be used in continuous dyeing in the stock, dyeing in the size press, in a conventional dipping or surface coloring process. The dyeing and printing of paper is effected by known methods.

The dyeings and prints and particularly those obtained on paper, show good fastness properties.

The compounds of formula (I) may be converted into dyeing preparations. Processing into stable liquid, preferably aqueous, or solid (granulated or powder form) dyeing preparations may take place in a generally known manner. Advantageously suitable liquid dyeing preparations may be made by dissolving the dyestuff in suitable solvents such as mineral acids or organic acids, e.g., hydrochloric acid, sulphuric acid, phosphoric acid, formic acid, acetic acid, lactic acid, glycolic acid, citric acid and methanesulphonic acid. Furthermore formamide, dimethylformamide, urea, glycols and ethers thereof, dextrin or addition products of boric acid with sorbit may be used together with water, optionally adding an assistant, e.g. a stabilizer. Such preparations may be obtained, for example, as described in French patent specification No. 1,572,030.

The compounds of formula (I) (in the corresponding salt form) have good solubility especially in cold water. Owing to their high substantivity the compounds of the present invention exhaust practically quantitatively and show a good build-up power. They can be added to the stock directly, i.e. without previously dissolving, as either a dry powder or granulate, without reducing the brilliance or the yield of color. They can also be used in soft water without loss of yield. They do not mottle when applied on paper, are not inclined to give two-sided dyeing on paper and are practically insensitive to filler or pH variations. They operate over a broad pH range, in the range of from pH 3 to 10. When producing sized or unsized paper, the wastewater is essentially colorless. This feature, which is extremely important from an environmental viewpoint, when compared with similar known dyes, shows a marked improvement. A sized paper dyeing when compared with the corresponding unsized paper dyeing does not show any decrease in strength.

The paper dyeings or printings made with the compounds according to the invention are clear and brilliant and have good light fastness. On exposure to light for a long time, the shade of the dyeing fades tone in tone. They show very good wet fastness properties; being fast to water, milk, fruit juice, sweetened mineral water, tonic water, soap and sodium chloride solution, urine etc. Furthermore, they have good alcohol fastness properties. The wet fastness properties are improved compared to known dyes showing otherwise similar properties. They do not exhibit a tendency towards two-sidedness.

Paper dyed or printed with the compounds of the present invention can be bleached either oxidatively or reductively, a feature, which is important for the recycling of waste paper and old paper products.

The compounds of the present invention may also be used to dye paper containing wood-pulp where even dyeings, having good fastness properties are obtained. Furthermore, they may be used for the production of coated paper in accordance with known methods. Preferably when coating, a suitable filler, for example kaolin, is employed in order to give a one-side coated paper.

The compounds of the present invention are also suitable for dyeing in combination with other dyes for example other cationic or anionic dyes. The compatibility of the compounds of the present invention when used as a dye in mixtures with other commercially available dyes, may be determined according to conventional methods. The thus obtained dyeings have good fastness properties.

The invention yet further provides use of a compound of the present invention for dyeing or printing any of the abovementioned substrates.

The invention further provides a substrate, which has been dyed or printed with a compound of the present invention. The substrate may be selected from any of the above mentioned substrates. A preferred substrate is a substrate comprising cellulose such as cotton or paper or paper based product.

The following examples further serve to illustrate the invention. In the Examples all parts and all percentages are by weight or volume, and the temperatures given are in degrees Celsius, unless indicated to the contrary.

EXAMPLE 1

168.5 parts 4-(2-hydroxyethoxy)-aniline are mixed with 1760 parts of water and 293 parts of a 30% solution of hydrochloric acid and are diazotized at 0–5° C. during 1 hour with 286.2 parts of a 4 n solution of sodium nitrite. During 1 hour the reaction mixture is then pumped to 4803 parts of an aqueous solution containing 534.2 parts of a coupling component of the following formula:

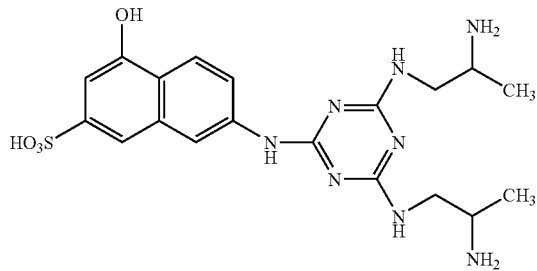

During the coupling reaction a pH of 4.5–5 is kept by the addition of a 30% solution of sodium hydroxide. The reaction mixture is stirred at room temperature and pH 4.5–5 for additional 10–14 hours. After rising the pH value to 8.2, the precipitated dyestuff is filtered off and washed with 2000 parts of a 5% solution of sodium bicarbonate, 1000 parts of a 2% solution of sodium bicarbonate and 2000 parts of a 1% solution of sodium bicarbonate. 2043.1 parts dyestuff presscake of the following formula are obtained (titer ca. 31.4%):

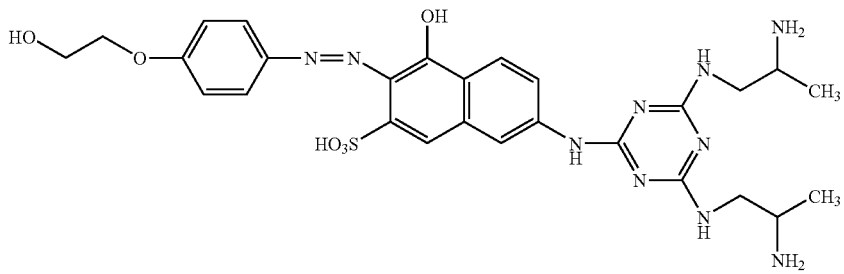

$\lambda_{max}$=512 nm in 1% acetic acid)

EXAMPLE 1a 33.5 parts of the dyestuff presscake from example 1 are dried at 80° C. in vacuum over night and are milled to obtain 11.5 parts of a dyestuff powder. It dyes sized and unsized paper in scarlet shades. The obtained fastnesses are excellent.

EXAMPLE 1b 300 parts of the dyestuff presscake from example 1 are added at 60–65° C. to a mixture of 100 parts of formic acid and 600 parts of water and are stirred for additional 30 min. 16 parts of Hyflo-Supercel (filtration auxiliary) are added at 60–65° C. and after 10 min stirring the mixture is filtered. 1000 parts of a long term stable liquid dyestuff formulation are obtained. It dyes sized or unsized paper in scarlet shades. The obtained fastnesses are excellent.

TABLE 1

(Examples 2–108)
In an analogous manner as described in Examples 1, 1a and 1b using the appropriate starting material, further compounds of formula (I) are produced. The compounds have the formula (Ia)

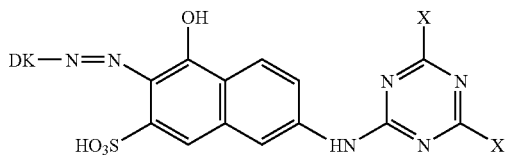

in which the symbols have the meaning given in the following table.

| No. | DK | X | Shade |
|---|---|---|---|
| 2 | 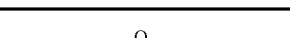 |  | orange |
| 3 |  |  | scarlet |

TABLE 1-continued (Examples 2–108)
In an analogous manner as described in Examples 1, 1a and 1b using the appropriate starting material, further compounds of formula (I) are produced. The compounds have the formula

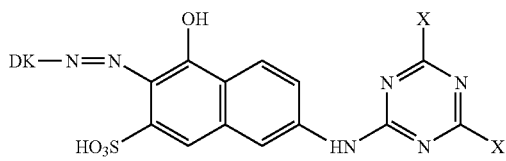

(Ia)

in which the symbols have the meaning given in the following table.

| No. | DK | X | Shade |
|---|---|---|---|
| 4 | 2-(pyrido[3,2-d]oxazol-2-yl)-p-tolyl | —NH—CH$_2$—CH(CH$_3$)—NH$_2$ | scarlet |
| 5 | 6-methyl-2-(benzothiazol-2-yl)-p-tolyl (H$_3$C on benzothiazole) | —NH—CH$_2$—CH(CH$_3$)—NH$_2$ | scarlet |
| 6 | 4-(2-hydroxyethoxy)phenyl | —NH—(CH$_2$)$_3$—N(C$_2$H$_5$)$_2$ | scarlet |
| 7 | 4-(2-hydroxyethoxy)phenyl | —NH—(CH$_2$)$_3$—N(CH$_3$)$_2$ | scarlet |
| 8 | 2,3-dihydro-1,4-benzodioxin-6-yl | —NH—CH$_2$—CH(CH$_3$)—NH$_2$ | red |
| 9 | 2,3-dihydro-1,4-benzodioxin-6-yl | —NH—(CH$_2$)$_3$—N(C$_2$H$_5$)$_2$ | red |
| 10 | 4-(2-sulfatoethoxy)phenyl (HO$_3$S—O—CH$_2$CH$_2$—O—C$_6$H$_4$—) | —NH—CH$_2$—CH(CH$_3$)—NH$_2$ | scarlet |
| 11 | 4-(2-sulfatoethoxy)phenyl | —NH—(CH$_2$)$_3$—N(C$_2$H$_5$)$_2$ | scarlet |
| 12 | 5-methoxy-2-methyl-phenyl-3-sulfonic acid (H$_3$CO-, -SO$_3$H, -CH$_3$) | —NH—(CH$_2$)$_3$—N(C$_2$H$_5$)$_2$ | scarlet |
| 13 | 2-methoxy-4,5-dimethyl-phenyl-sulfonic acid (OCH$_3$, HO$_3$S, H$_3$C, H$_3$C) | —NH—CH$_2$—CH(CH$_3$)—NH$_2$ | scarlet |

TABLE 1-continued (Examples 2–108)
In an analogous manner as described in Examples 1, 1a and 1b using the appropriate starting material, further compounds of formula (I) are produced. The compounds have the formula

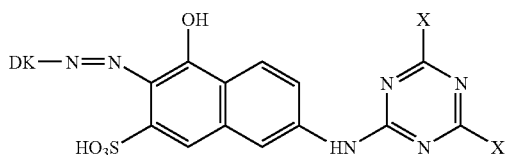

(Ia)

in which the symbols have the meaning given in the following table.

| No. | DK | X | Shade |
|---|---|---|---|
| 14 | 2-methoxy-4-sulfo-5-methylphenyl (OCH$_3$, HO$_3$S, H$_3$C substituents) | —NH—CH$_2$CH$_2$CH$_2$—N(C$_2$H$_5$)$_2$ | scarlet |
| 15 | HO-CH$_2$CH$_2$-O-C$_6$H$_4$— | —NH—CH$_2$CH$_2$CH$_2$—N(C$_2$H$_4$—OH)$_2$ | scarlet |
| 16 | HO$_3$S—O—CH$_2$CH$_2$-O-C$_6$H$_4$— | —NH—CH$_2$CH$_2$CH$_2$—N(C$_2$H$_4$—OH)$_2$ | scarlet |
| 17 | HO-CH$_2$CH$_2$-O-C$_6$H$_4$— | —NH—CH$_2$CH$_2$—N(C$_2$H$_5$)$_2$ | scarlet |
| 18 | HO$_3$S—O—CH$_2$CH$_2$-O-C$_6$H$_4$— | —NH—CH$_2$CH$_2$—N(C$_2$H$_5$)$_2$ | scarlet |
| 19 | 2-methyl-5-methoxy-phenyl with SO$_3$H (H$_3$CO, SO$_3$H substituents) | —NH—CH$_2$CH$_2$—N(C$_2$H$_5$)$_2$ | scarlet |
| 20 | HO-CH$_2$CH$_2$-O-C$_6$H$_4$— | —NH—CH$_2$—CH(CH$_3$)—NH$_2$ | scarlet |
| 21 | HO-CH$_2$CH$_2$-O-C$_6$H$_4$— | —NH—CH$_2$CH$_2$—(pyrrolidin-1-yl) | scarlet |
| 22 | HO$_3$S—O—CH$_2$CH$_2$-O-C$_6$H$_4$— | —NH—CH$_2$CH$_2$—(pyrrolidin-1-yl) | scarlet |
| 23 | 2-methyl-5-methoxy-phenyl with SO$_3$H (H$_3$CO, SO$_3$H substituents) | —NH—CH$_2$CH$_2$—(pyrrolidin-1-yl) | scarlet |

TABLE 1-continued (Examples 2–108)
In an analogous manner as described in Examples 1, 1a and 1b using the appropriate starting material, further compounds of formula (I) are produced. The compounds have the formula

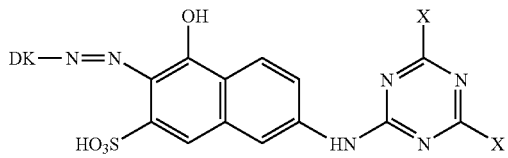

(Ia)

in which the symbols have the meaning given in the following table.

| No. | DK | X | Shade |
|---|---|---|---|
| 24 | HO-CH2CH2-O-C6H4- | -NH-CH2CH2-N(morpholino) | scarlet |
| 25 | HO3S-O-CH2CH2-O-C6H4- | -NH-CH2CH2-N(morpholino) | scarlet |
| 26 | H3CO-C6H3(SO3H)(CH3)- | -NH-CH2CH2-N(morpholino) | scarlet |
| 27 | H3CO-C6H3(SO3H)(CH3)- | -NH-C3H6-N(C2H4-OH)(C2H4-OH) | scarlet |
| 28 | HO-CH2CH2-O-C6H4- | -NH-C3H6-N(piperidino) | scarlet |
| 29 | HO3S-O-CH2CH2-O-C6H4- | -NH-C3H6-N(piperidino) | scarlet |
| 30 | H3CO-C6H3(SO3H)(CH3)- | -NH-C3H6-N(piperidino) | scarlet |
| 31 | 6-methyl-quinazoline-2,4-dione-yl | -NH-C3H6-N(C2H5)(C2H5) | scarlet |
| 32 | 6-methoxy-7-methyl-quinoxaline-2,3-dione-yl | -NH-C3H6-N(C2H5)(C2H5) | violet |

TABLE 1-continued (Examples 2–108)
In an analogous manner as described in Examples 1, 1a and 1b using the appropriate
starting material, further compounds of formula (I) are produced. The compounds have
the formula (Ia)

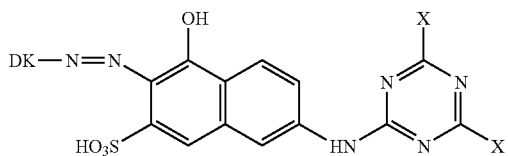

in which the symbols have the meaning given in the following table.

| No. | DK | X | Shade |
|---|---|---|---|
| 33 | 1-methyl-5-methyl-benzimidazol-2-one | —NH—(CH$_2$)$_3$—N(C$_2$H$_5$)$_2$ | red |
| 34 | 1-ethyl-5-methyl-benzimidazol-2-one | —NH—(CH$_2$)$_3$—N(C$_2$H$_5$)$_2$ | red |
| 35 | 5-methyl-benzimidazol-2-one | —NH—(CH$_2$)$_3$—N(C$_2$H$_5$)$_2$ | red |
| 36 | 5,6-dimethyl-benzimidazol-2-one | —NH—(CH$_2$)$_3$—N(C$_2$H$_5$)$_2$ | red |
| 37 | 5-chloro-6-methyl-benzimidazol-2-one | —NH—(CH$_2$)$_3$—N(C$_2$H$_5$)$_2$ | red |
| 38 | 5-hydroxy-6-methyl-benzimidazol-2-one | —NH—(CH$_2$)$_3$—N(C$_2$H$_5$)$_2$ | violet |
| 39 | 5-methoxy-6-methyl-benzimidazol-2-one | —NH—(CH$_2$)$_3$—N(C$_2$H$_5$)$_2$ | violet |
| 40 | 6-methyl-quinazoline-2,4-dione | —NH—CH$_2$—CH(NH$_2$)—CH$_3$ | scarlet |

TABLE 1-continued
(Examples 2–108)
In an analogous manner as described in Examples 1, 1a and 1b using the appropriate
starting material, further compounds of formula (I) are produced. The compounds have
the formula
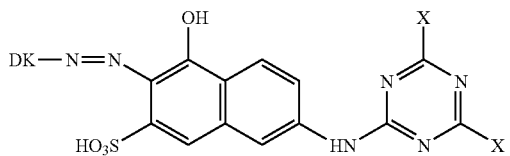
(Ia)
in which the symbols have the meaning given in the following table.
| No. | DK | X | Shade |
|---|---|---|---|
| 41 | | | violet |
| 42 | | | red |
| 43 | | | red |
| 44 | | | red |
| 45 | | | red |
| 46 | | | red |
| 47 | | | red |
| 48 | | | violet |

TABLE 1-continued (Examples 2–108)
In an analogous manner as described in Examples 1, 1a and 1b using the appropriate starting material, further compounds of formula (I) are produced. The compounds have the formula

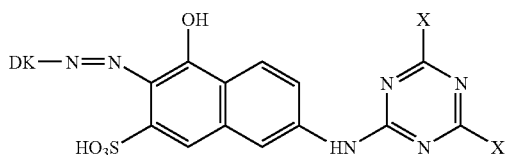

(Ia)

in which the symbols have the meaning given in the following table.

| No. | DK | X | Shade |
|-----|----|----|-------|
| 49 | quinoxaline-2,3-dione with OCH₃ and CH₃ substituents | —NH—C₃H₆—N(C₂H₄—OH)₂ | violet |
| 50 | quinazoline-2,4-dione with CH₃ substituent | —NH—C₂H₄—morpholine | scarlet |
| 51 | quinazoline-2,4-dione with CH₃ substituent | —NH—C₃H₆—N(C₂H₄—OH)₂ | scarlet |
| 52 | quinoxaline-2,3-dione with CH₃ substituent | —NH—CH(CH₃)—CH₂—NH₂ | red |
| 53 | quinoxaline-2,3-dione with CH₃ substituent | —NH—C₃H₆—N(C₂H₅)₂ | red |
| 54 | HO—C₂H₄—O—C₆H₄— | —N(piperazine)—C₂H₄—NH₂ | scarlet |
| 55 | HO—C₂H₄—O—C₆H₄— | —N(piperazine)—C₂H₄—OH | scarlet |
| 56 | benzimidazol-2-one with CH₃ substituent | —N(piperazine)—C₂H₄—NH₂ | red |
| 57 | benzimidazol-2-one with CH₃ substituent | —N(piperazine)—C₂H₄—OH | red |

TABLE 1-continued (Examples 2–108)
In an analogous manner as described in Examples 1, 1a and 1b using the appropriate starting material, further compounds of formula (I) are produced. The compounds have the formula

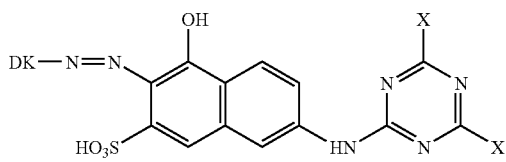

(Ia)

in which the symbols have the meaning given in the following table.

| No. | DK | X | Shade |
|---|---|---|---|
| 58 | quinoxaline-2,3-dione with OCH₃ and CH₃ substituents | piperazine-ethylamine | violet |
| 59 | quinoxaline-2,3-dione with OCH₃ and CH₃ substituents | piperazine-ethanol | violet |
| 60 | quinazoline-2,4-dione with CH₃ substituent | piperazine-ethylamine | scarlet |
| 61 | quinazoline-2,4-dione with CH₃ substituent | piperazine-ethanol | scarlet |
| 62 | quinoxaline-2,3-dione with CH₃ substituent | piperazine-ethylamine | red |
| 63 | quinoxaline-2,3-dione with CH₃ substituent | piperazine-ethanol | red |
| 64 | hydroxyethylsulfonyl-methoxy-methylphenyl | —NH—CH₂—CH(CH₃)—NH₂ | orange |
| 65 | hydroxyethylsulfonyl-methoxy-methylphenyl | —NH—(CH₂)₃—N(C₂H₅)₂ | orange |

TABLE 1-continued (Examples 2–108)
In an analogous manner as described in Examples 1, 1a and 1b using the appropriate starting material, further compounds of formula (I) are produced. The compounds have the formula

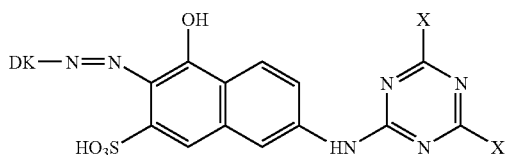

(Ia)

in which the symbols have the meaning given in the following table.

| No. | DK | X | Shade |
|---|---|---|---|
| 66 | HO-CH2CH2-SO2-(2-methoxy-4,5-dimethylphenyl) | —NH-CH2-CH(CH3)-NH2 | orange |
| 67 | HO-CH2CH2-SO2-(2-methoxy-4,5-dimethylphenyl) | —NH-CH2CH2CH2-N(C2H5)2 | orange |
| 68 | H3C-CH2-CH(OH)-CH2-O-(p-phenylene)- | —NH-CH2-CH(CH3)-NH2 | scarlet |
| 69 | H3C-CH2-CH(OH)-CH2-O-(p-phenylene)- | —NH-CH2CH2CH2-N(C2H5)2 | scarlet |
| 70 | (CH3)2N-CH2CH2-O-(p-phenylene)- | —NH-CH2-CH(CH3)-NH2 | scarlet |
| 71 | (H3C-CH2)2N-CH2CH2-O-(p-phenylene)- | —NH-CH2-CH(CH3)-NH2 | scarlet |
| 72 | morpholino-CH2CH2-O-(p-phenylene)- | —NH-CH2-CH(CH3)-NH2 | scarlet |
| 73 | (CH3)2N-CH2CH2CH2-O-(p-phenylene)- | —NH-CH2-CH(CH3)-NH2 | scarlet |
| 74 | morpholino-CH2CH2-O-phenyl- | *HN-CH2CH2CH2-N(CH3)2 | scarlet |

TABLE 1-continued (Examples 2–108)
In an analogous manner as described in Examples 1, 1a and 1b using the appropriate starting material, further compounds of formula (I) are produced. The compounds have the formula

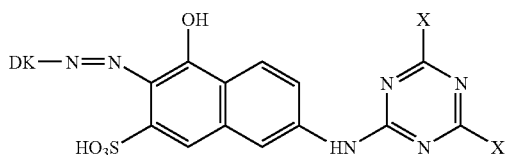

(Ia)

in which the symbols have the meaning given in the following table.

| No. | DK | X | Shade |
|---|---|---|---|
| 75 | morpholine-N-CH2CH2-O-C6H4-* | *HN-CH2CH2CH2-N(CH3)2 | scarlet |
| 76 | pyrrolidine-N-CH2CH2-O-C6H4-* | *HN-CH2-CH(CH3)-NH2 | scarlet |
| 78 | piperidine-N-CH2CH2-O-C6H4-* | *HN-CH2-CH(CH3)-NH2 | scarlet |
| 79 | piperidine-N-CH2CH2-O-C6H4-* | *HN-CH2CH2CH2-N(CH3)2 | scarlet |
| 80 | (HOCH2CH2)2N-CH2CH2-O-C6H4-* | *HN-CH2-CH(CH3)-NH2 | red |
| 81 | (CH3)2N-CH2CH2-O-C6H4-* | *HN-CH2CH2CH2-N(CH3)2 | scarlet |
| 82 | piperidine-N-C(O)-CH2-O-C6H4-* | *HN-CH2-CH(CH3)-NH2 | scarlet |
| 83 | (CH3)2N-CH2-C6H4-* | *HN-CH2-CH(CH3)-NH2 | orange |
| 84 | 4-CH3-piperidine-N-C(O)-CH2-O-C6H4-* | *HN-CH2-CH(CH3)-NH2 | scarlet |

TABLE 1-continued (Examples 2–108)
In an analogous manner as described in Examples 1, 1a and 1b using the appropriate starting material, further compounds of formula (I) are produced. The compounds have the formula

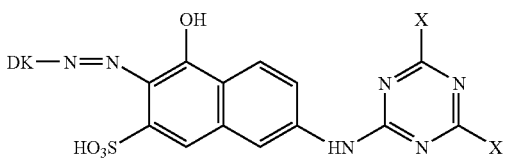

(Ia)

in which the symbols have the meaning given in the following table.

| No. | DK | X | Shade |
|---|---|---|---|
| 85 | 2-ethylpiperidine-N-C(O)-CH2-O-C6H4-* | *HN-CH(CH3)-CH2-NH2 | scarlet |
| 86 | H2N-C(O)-CH2-O-C6H4-* | *HN-CH(CH3)-CH2-NH2 | scarlet |
| 87 | (H3C)2N-C(O)-CH2-O-C6H4-* | *HN-CH(CH3)-CH2-NH2 | scarlet |
| 88 | (H3C-CH2)2N-C(O)-CH2-O-C6H4-* | *HN-CH(CH3)-CH2-NH2 | scarlet |
| 89 | piperazine-N-C(O)-CH2-O-C6H4-* | *HN-CH(CH3)-CH2-NH2 | scarlet |
| 90 | 4-methylpiperazine-N-C(O)-CH2-O-C6H4-* | *HN-CH(CH3)-CH2-NH2 | scarlet |
| 91 | morpholine-N-C(O)-CH2-O-C6H4-* | *HN-CH(CH3)-CH2-NH2 | scarlet |
| 92 | piperidine-N-C(O)-CH2-O-C6H4-* | *HN-CH2-CH2-CH2-N(CH2CH3)2 | scarlet |

TABLE 1-continued
(Examples 2–108)
In an analogous manner as described in Examples 1, 1a and 1b using the appropriate starting material, further compounds of formula (I) are produced. The compounds have the formula
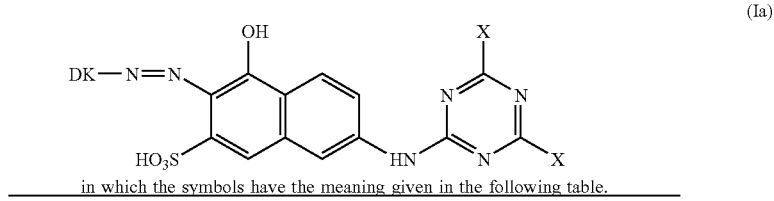
(Ia)
in which the symbols have the meaning given in the following table.
| No. | DK | X | Shade |
|---|---|---|---|
| 93 |  |  | scarlet |
| 94 | 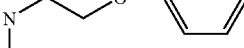 |  | scarlet |
| 95 |  | 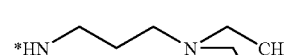 | scarlet |
| 96 |  | 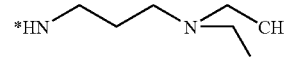 | scarlet |
| 97 |  | 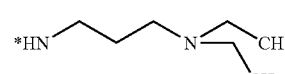 | scarlet |
| 98 |  |  | scarlet |
| 99 |  |  | scarlet |
| 100 | 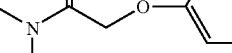 |  | scarlet |

TABLE 1-continued (Examples 2–108)
In an analogous manner as described in Examples 1, 1a and 1b using the appropriate starting material, further compounds of formula (I) are produced. The compounds have the formula (Ia)

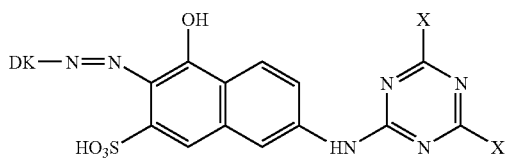

in which the symbols have the meaning given in the following table.

| No. | DK | X | Shade |
|---|---|---|---|
| 101 | 4-methylpiperidin-1-yl-ethoxy-phenyl | *HN-CH₂CH₂CH₂-N(CH₂CH₃)₂ | scarlet |
| 102 | 4-methylpiperidin-1-yl-ethoxy-phenyl | *HN-CH(CH₃)-CH₂-NH₂ | scarlet |
| 103 | 2-ethylpiperidin-1-yl-ethoxy-phenyl | *HN-CH₂CH₂CH₂-N(CH₂CH₃)₂ | scarlet |
| 104 | 2-ethylpiperidin-1-yl-ethoxy-phenyl | *HN-CH(CH₃)-CH₂-NH₂ | scarlet |
| 105 | 4-methylpiperazin-1-yl-ethoxy-phenyl | *HN-CH₂CH₂CH₂-N(CH₂CH₃)₂ | scarlet |
| 106 | 4-methylpiperazin-1-yl-ethoxy-phenyl | *HN-CH(CH₃)-CH₂-NH₂ | scarlet |

TABLE 1-continued (Examples 2–108)
In an analogous manner as described in Examples 1, 1a and 1b using the appropriate starting material, further compounds of formula (I) are produced. The compounds have the formula

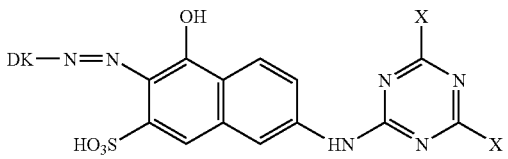

(Ia)

in which the symbols have the meaning given in the following table.

| No. | DK | X | Shade |
|---|---|---|---|
| 107 | ![piperazine-ethoxy-phenyl] | *HN–CH₂CH₂CH₂–N(CH₂CH₃)₂ | scarlet |
| 108 | ![piperazine-ethoxy-phenyl] | *HN–CH₂–CH(CH₃)–NH₂ | scarlet |

EXAMPLE 109

61.3 parts 4-(2-hydroxyethoxy)-aniline are mixed with 640 parts of water and 106.5 parts of a 30% solution of hydrochloric acid and diazotized at 0–5° C. during 1 hour with 102.4 parts of a 4 n solution of sodium nitrite. During 1 hour the reaction mixture is pumped to 1560 parts of an aqueous solution containing 228.4 parts of a coupling component of the following formula:

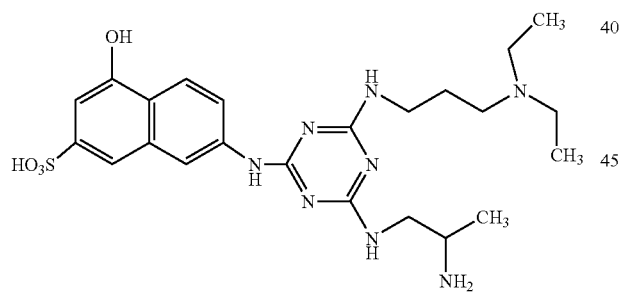

During the coupling reaction a pH of 4.5–5 is kept by the addition of a 15% solution of sodium carbonate. The reaction mixture is stirred at room temperature and at pH 4.5–5 for additional 10–14 hours. After adjusting the pH value to 4.0, ca. 800 parts of sodium chloride are added in portions. The precipitated dyestuff is filtered off to a yield of 692.5 parts dyestuff presscake. After drying for 12 hours at 80° C. 429 parts of a dyestuff of the following formula are obtained ($\lambda_{max}$=513 nm in 1% acetic acid):

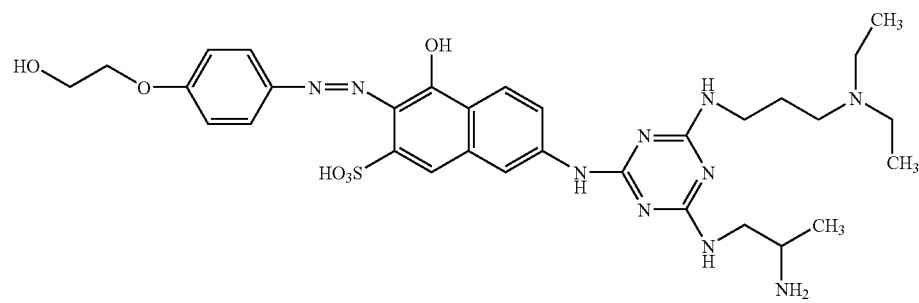

It dyes sized or unsized paper in scarlet shades. The obtained fastnesses are excellent.

TABLE 2

(Examples 110–160)
In an analogous manner as described in Example 109 using the appropriate starting material, further compounds of formula (I) are produced. The compounds have the formula

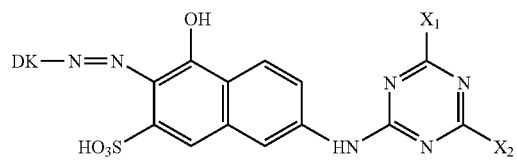

(Ib)

in which the symbols have the meaning given in the following table.

| No. | DK | $X_1$ | $X_2$ | Shade |
|---|---|---|---|---|
| 110 | 5-methyl-benzimidazolone | —NH—CH(CH$_3$)—CH$_2$—NH$_2$ | —NH—(CH$_2$)$_3$—N(C$_2$H$_5$)$_2$ | red |
| 111 | 5,6-dimethyl-benzimidazolone | —NH—CH(CH$_3$)—CH$_2$—NH$_2$ | —NH—(CH$_2$)$_3$—N(C$_2$H$_5$)$_2$ | red |
| 112 | 5-chloro-6-methyl-benzimidazolone | —NH—CH(CH$_3$)—CH$_2$—NH$_2$ | —NH—(CH$_2$)$_3$—N(C$_2$H$_5$)$_2$ | red |
| 113 | 5-hydroxy-6-methyl-benzimidazolone | —NH—CH(CH$_3$)—CH$_2$—NH$_2$ | —NH—(CH$_2$)$_3$—N(C$_2$H$_5$)$_2$ | violet |
| 114 | 5-methoxy-6-methyl-benzimidazolone | —NH—CH(CH$_3$)—CH$_2$—NH$_2$ | —NH—(CH$_2$)$_3$—N(C$_2$H$_5$)$_2$ | violet |
| 115 | 6-methyl-quinazoline-2,4-dione | —NH—CH(CH$_3$)—CH$_2$—NH$_2$ | —NH—(CH$_2$)$_3$—N(C$_2$H$_5$)$_2$ | scarlet |
| 116 | 6-methyl-quinoxaline-2,3-dione | —NH—CH(CH$_3$)—CH$_2$—NH$_2$ | —NH—(CH$_2$)$_3$—N(C$_2$H$_5$)$_2$ | red |
| 117 | 6-methoxy-7-methyl-quinoxaline-2,3-dione | —NH—CH(CH$_3$)—CH$_2$—NH$_2$ | —NH—(CH$_2$)$_3$—N(C$_2$H$_5$)$_2$ | violet |

TABLE 2-continued (Examples 110–160)
In an analogous manner as described in Example 109 using the appropriate starting material, further compounds of formula (I) are produced. The compounds have the formula

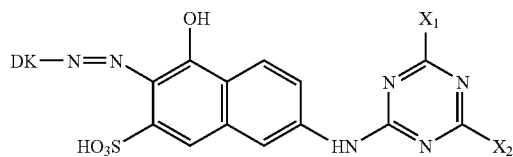

(Ib)

in which the symbols have the meaning given in the following table.

| No. | DK | X₁ | X₂ | Shade |
|---|---|---|---|---|
| 118 | HO–CH₂CH₂–SO₂–(2-methoxy-4,5-dimethylphenyl) | —NH–CH(CH₃)–CH₂–NH₂ | —NH–(CH₂)₃–N(C₂H₅)₂ | orange |
| 119 | (CH₃)₂N–CH₂CH₂–O–(4-methylphenyl) | —NH–CH(CH₃)–CH₂–NH₂ | —NH–(CH₂)₃–N(C₂H₅)₂ | scarlet |
| 120 | morpholino–CH₂CH₂–O–phenyl–* | *HN–(CH₂)₃–N(C₂H₅)(CH₃) [*HN–CH₂CH₂CH₂–N(CH₂CH₃)₂... see image] | *HN–CH₂–CH(CH₃)–NH₂ | scarlet |
| 121 | morpholino–CH₂CH₂–O–phenyl–* | *HN–(CH₂)₃–N(CH₃)₂ | *HN–CH₂–CH(CH₃)–NH₂ | scarlet |
| 122 | morpholino–CH₂CH₂–O–phenyl–* | *NH₂ | *HN–CH₂–CH(CH₃)–NH₂ | scarlet |
| 123 | morpholino–CH₂CH₂–O–phenyl–* | *HN—CH₃ | *HN–CH₂–CH(CH₃)–NH₂ | scarlet |
| 124 | morpholino–CH₂CH₂–O–phenyl–* | *HN–CH₃ | *HN–CH₂–CH(CH₃)–NH₂ | scarlet |
| 125 | morpholino–CH₂CH₂–O–phenyl–* | *HN–CH₂CH₂–OH | *HN–CH₂–CH(CH₃)–NH₂ | scarlet |

TABLE 2-continued (Examples 110–160)
In an analogous manner as described in Example 109 using the appropriate starting material, further compounds of formula (I) are produced. The compounds have the formula

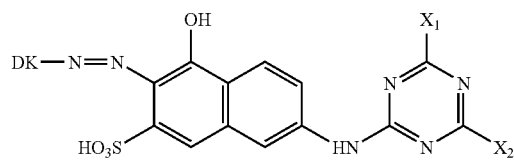

(Ib)

in which the symbols have the meaning given in the following table.

| No. | DK | X₁ | X₂ | Shade |
|---|---|---|---|---|
| 126 | morpholinoethoxyphenyl | N*(CH₂CH₂OH)₂ | *HN-CH₂-CH(CH₃)-NH₂ | scarlet |
| 127 | morpholinoethoxyphenyl | *N(CH₂CH₂OH)(CH₂CH₃) | *HN-CH₂-CH(CH₃)-NH₂ | scarlet |
| 128 | morpholinoethoxyphenyl | *HN-CH(CH₂OH)₂ | *HN-CH₂-CH(CH₃)-NH₂ | scarlet |
| 129 | morpholinoethoxyphenyl | *HN-CH₂-CH(OH)-CH₃ | *HN-CH₂-CH(CH₃)-NH₂ | scarlet |
| 130 | morpholinoethoxyphenyl | piperazinyl-CH₂CH₂NH₂ | *HN-CH₂-CH(CH₃)-NH₂ | scarlet |
| 131 | morpholinoethoxyphenyl | piperazinyl-CH₂CH₂OH | *HN-CH₂-CH(CH₃)-NH₂ | scarlet |
| 132 | morpholinoethoxyphenyl | 2,2,6,6-tetramethylpiperidin-4-ylamino | *HN-CH₂-CH(CH₃)-NH₂ | scarlet |
| 133 | morpholinoethoxyphenyl | 2,2,6,6-tetramethylpiperidin-4-ylamino | *HN-CH₂CH₂CH₂-N(CH₂CH₃)₂ | scarlet |

TABLE 2-continued (Examples 110–160)
In an analogous manner as described in Example 109 using the appropriate starting material, further compounds of formula (I) are produced. The compounds have the formula

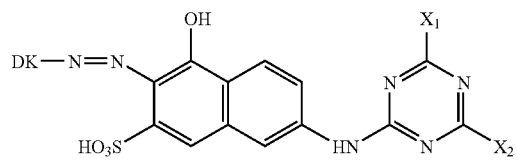

(Ib)

in which the symbols have the meaning given in the following table.

| No. | DK | X₁ | X₂ | Shade |
|---|---|---|---|---|
| 134 | H₃C−N(CH₃)−CH₂CH₂−O−phenyl−* | *HN−CH₃ | *HN−CH₂−CH(CH₃)−NH₂ | scarlet |
| 135 | H₃C−N(CH₃)−CH₂CH₂−O−phenyl−* | *HN−CH₂−CH(CH₃)−NH₂ | *HN−CH₂CH₂CH₂−N(CH₂CH₃)₂ | scarlet |
| 136 | piperidinyl−CH₂CH₂−O−phenyl−* | *NH₂ | *HN−CH₂−CH(CH₃)−NH₂ | scarlet |
| 137 | piperidinyl−CH₂CH₂−O−phenyl−* | *HN−CH₃ | *HN−CH₂−CH(CH₃)−NH₂ | scarlet |
| 138 | piperidinyl−CH₂CH₂−O−phenyl−* | *HN−CH₂CH₂CH₂−N(CH₃)₂ | *HN−CH₂−CH(CH₃)−NH₂ | scarlet |
| 139 | piperidinyl−CH₂CH₂−O−phenyl−* | *HN−CH₂CH₃ | *HN−CH₂−CH(CH₃)−NH₂ | scarlet |
| 139 | piperidinyl−CH₂CH₂−O−phenyl−* | *HN−CH₂CH₂−OH | *HN−CH₂−CH(CH₃)−NH₂ | scarlet |
| 140 | piperidinyl−CH₂CH₂−O−phenyl−* | N*(CH₂CH₂OH)₂ | *HN−CH₂−CH(CH₃)−NH₂ | scarlet |
| 141 | piperidinyl−CH₂CH₂−O−phenyl−* | N*(CH₂CH₂OH)(CH₃) | *HN−CH₂−CH(CH₃)−NH₂ | scarlet |

TABLE 2-continued
(Examples 110–160)
In an analogous manner as described in Example 109 using the appropriate starting material, further compounds of formula (I) are produced. The compounds have the formula
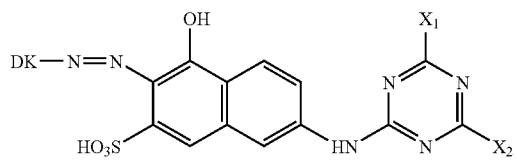
(Ib)
in which the symbols have the meaning given in the following table.
| No. | DK | X₁ | X₂ | Shade |
|-----|----|----|----|-------|
| 142 | | | | scarlet |
| 143 | | | | scarlet |
| 144 | | | | scarlet |
| 145 | | | | scarlet |
| 146 | | | | scarlet |
| 147 | | | | scarlet |
| 148 | | | | scarlet |
| 149 | | | | scarlet |

TABLE 2-continued (Examples 110–160)
In an analogous manner as described in Example 109 using the appropriate starting material, further compounds of formula (I) are produced. The compounds have the formula

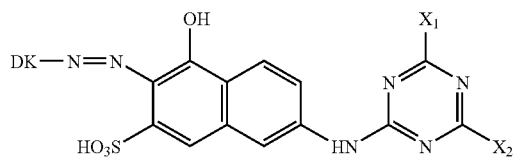
(Ib)

in which the symbols have the meaning given in the following table.

| No. | DK | $X_1$ | $X_2$ | Shade |
|---|---|---|---|---|
| 150 | 2-ethylpiperidinyl-C(O)-CH2-O-phenyl-* | *HN-(CH2)3-N(C2H5)(CH3) | *HN-CH2-CH(CH3)-NH2 | scarlet |
| 151 | H2N-C(O)-CH2-O-phenyl-* | *HN-(CH2)3-N(C2H5)(CH3) | *HN-CH2-CH(CH3)-NH2 | scarlet |
| 152 | (CH3)2N-C(O)-CH2-O-phenyl-* | *HN-(CH2)3-N(C2H5)(CH3) | *HN-CH2-CH(CH3)-NH2 | scarlet |
| 153 | (C2H5)2N-C(O)-CH2-O-phenyl-* | *HN-(CH2)3-N(C2H5)(CH3) | *HN-CH2-CH(CH3)-NH2 | scarlet |
| 154 | piperazinyl-C(O)-CH2-O-phenyl-* | *HN-(CH2)3-N(C2H5)(CH3) | *HN-CH2-CH(CH3)-NH2 | scarlet |
| 155 | 4-methylpiperazinyl-C(O)-CH2-O-phenyl-* | *HN-(CH2)3-N(C2H5)(CH3) | *HN-CH2-CH(CH3)-NH2 | scarlet |
| 156 | morpholinyl-C(O)-CH2-O-phenyl-* | *HN-(CH2)3-N(C2H5)(CH3) | *HN-CH2-CH(CH3)-NH2 | scarlet |
| 157 | 4-methylpiperidinyl-CH2-CH2-O-phenyl-* | *HN-(CH2)3-N(C2H5)(CH3) | *HN-CH2-CH(CH3)-NH2 | scarlet |

TABLE 2-continued (Examples 110–160)

In an analogous manner as described in Example 109 using the appropriate starting material, further compounds of formula (I) are produced. The compounds have the formula

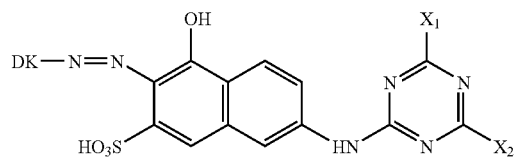

(Ib)

in which the symbols have the meaning given in the following table.

| No. | DK | X₁ | X₂ | Shade |
|---|---|---|---|---|
| 158 | (2-ethylpiperidinyl-ethoxy-phenyl) | *HN-(CH₂)₃-N(CH₃)(C₂H₅...) | *HN-CH₂-CH(CH₃)-NH₂ | scarlet |
| 159 | (4-methylpiperazinyl-ethoxy-phenyl) | *HN-(CH₂)₃-N(CH₃)(C₂H₅...) | *HN-CH₂-CH(CH₃)-NH₂ | scarlet |
| 160 | (piperazinyl-ethoxy-phenyl) | *HN-(CH₂)₃-N(CH₃)(C₂H₅...) | *HN-CH₂-CH(CH₃)-NH₂ | scarlet |

EXAMPLE 161

12.2 parts 1,2 bis(4-aminophenoxy)ethane are mixed with 250 parts of water and 40 parts of a 30% solution of hydrochloric acid and are diazotized at 0–5° C. during 1 hour with 25.7 parts of a 4 n solution of sodium nitrite. During 1 hour, the reaction mixture is pumped to 405 parts of an aqueous solution containing 50.9 parts of a coupling component of the following formula:

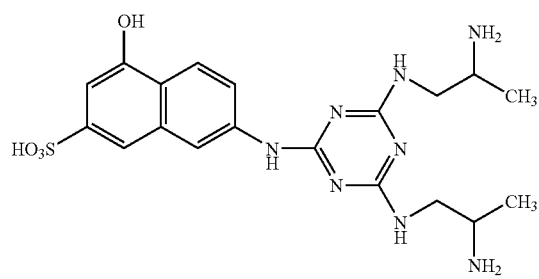

During the coupling reaction a pH of 4.5–5 is kept by the addition of a 15% solution of sodium carbonate. The reaction mixture is stirred at room temperature and pH 4.5–5 for additional 10–14 hours. The precipitated dyestuff is filtered off to yield 241.7 parts dyestuff presscake. After drying for 12 h at 80° C. 83.3 parts of a dyestuff of the following formula are obtained ($\lambda_{max}$=556 nm in 1% acetic acid):

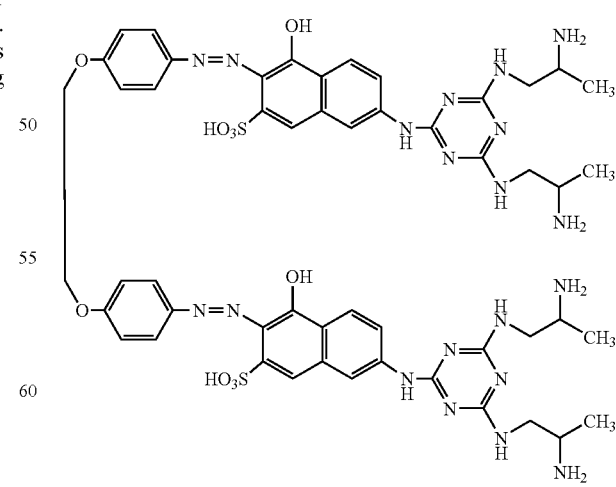

It dyes sized and unsized paper in red shades. The obtained fastness properties are excellent.

TABLE 3

(Examples 162–180)
In an analogous manner as described in Example 161 using the appropriate starting material, further compounds of formula (I) are produced. The compounds have the formula (Ic)

| No. | DK' | X | Shade |
|---|---|---|---|
| 162 | *4-[2-(4-methylphenoxy)ethoxy]phenyl-linked bis-tolyl via —O—CH₂CH₂—O—* | —NH—CH₂CH₂CH₂—N(C₂H₅)₂ | red |
| 163 | *bis-tolyl linked by —NH—C(=O)—* (benzanilide-type) | —NH—CH₂CH₂CH₂—N(C₂H₅)₂ | red |
| 164 | *bis-tolyl linked by —NH—C(=O)—NH—* (urea) | —NH—CH₂CH₂CH₂—N(C₂H₅)₂ | red |
| 165 | *bis-tolyl linked by —NH—C(=O)—CH₂CH₂—C(=O)—NH—* (succinamide) | —NH—CH₂CH₂CH₂—N(C₂H₅)₂ | red |
| 166 | *bis-tolyl linked by —NH—C(=O)—CH=CH—C(=O)—NH—* (maleamide, cis) | —NH—CH₂CH₂CH₂—N(C₂H₅)₂ | red |
| 167 | *bis(4-methylphenylsulfonyl)ethyl succinate diester* | —NH—CH₂CH₂CH₂—N(C₂H₅)₂ | orange |

TABLE 3-continued (Examples 162–180)
In an analogous manner as described in Example 161 using the appropriate starting material, further compounds of formula (I) are produced. The compounds have the formula (Ic)

| No. | DK' | X | Shade |
|-----|-----|---|-------|
| 168 | maleate diester of 2-(4-methylphenylsulfonyl)ethanol | —NH-CH₂CH₂CH₂-N(C₂H₅)₂ | orange |
| 169 | terephthalate diester of 2-(4-methylphenylsulfonyl)ethanol | —NH-CH₂CH₂CH₂-N(C₂H₅)₂ | orange |
| 170 | malonate diester of 2-(4-methylphenylsulfonyl)ethanol | —NH-CH₂CH₂CH₂-N(C₂H₅)₂ | orange |
| 171 | [H₃C-N(CH₃)-CH₂CH₂-O-C₆H₄-*]₂ | *HN-CH₂CH₂CH₂-N(CH₂CH₃)(CH₃) | scarlet |
| 172 | [H₃C-N(CH₃)-CH₂CH₂-O-C₆H₄-*]₂ | *HN-CH(CH₃)-CH₂-NH₂ | scarlet |
| 173 | bis(5-methoxy-2-methylphenylsulfonyl)ethylenediamide | *HN-CH(CH₃)-CH₂-NH₂ | scarlet |

TABLE 3-continued (Examples 162–180)
In an analogous manner as described in Example 161 using the appropriate starting material, further compounds of formula (I) are produced. The compounds have the formula (Ic)

| No. | DK' | X | Shade |
|-----|-----|---|-------|
| 174 | | | scarlet |
| 175 | | | scarlet |
| 176 | | | scarlet |
| 177 | | | scarlet |
| 178 | | | scarlet |

TABLE 3-continued (Examples 162–180)
In an analogous manner as described in Example 161 using the appropriate starting material, further compounds of formula (I) are produced. The compounds have the formula

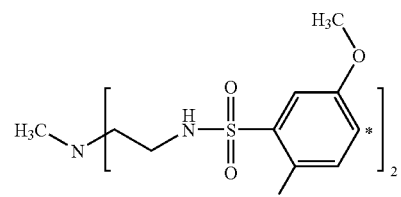
(Ic)

| No. | DK' | X | Shade |
|---|---|---|---|
| 179 | 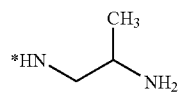 | 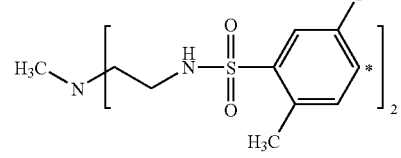 | scarlet |
| 180 | 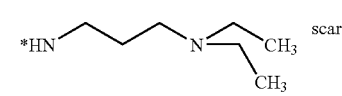 | 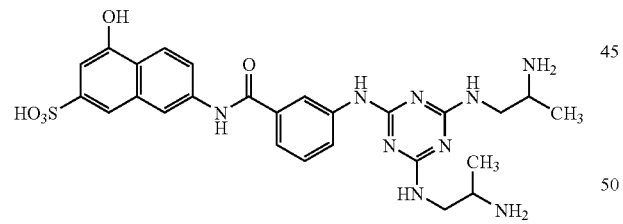 | scarlet |

EXAMPLE 181

11.7 parts 1-Dimethylamino-2-(4-aminophenoxy)-ethane are mixed with 150 parts of water and 27 parts of a 30% solution of hydrochloric acid and diazotized at 0–5° C. during 1 hour with 15.8 parts of a 4 n solution of sodium nitrite. Afterwards 46.5 parts of a coupling component of the following formula was added:

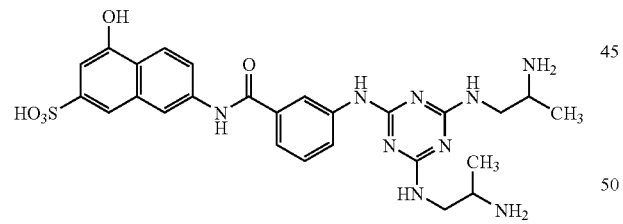

During the coupling reaction at room temperature first a pH of 4.0–4.5 is kept for 2 hours and then for 12 hours at 5.5–6.0 by the addition of 100 parts of a 15% solution of sodium carbonate. The precipitated dyestuff is filtered off to yield 138.6 parts dyestuff presscake. After drying for 12 hours at 60° C. 60.9 parts o a dystuff of the following formula are obtained ($\lambda_{max}$=511 nm in 1% acetic acid):

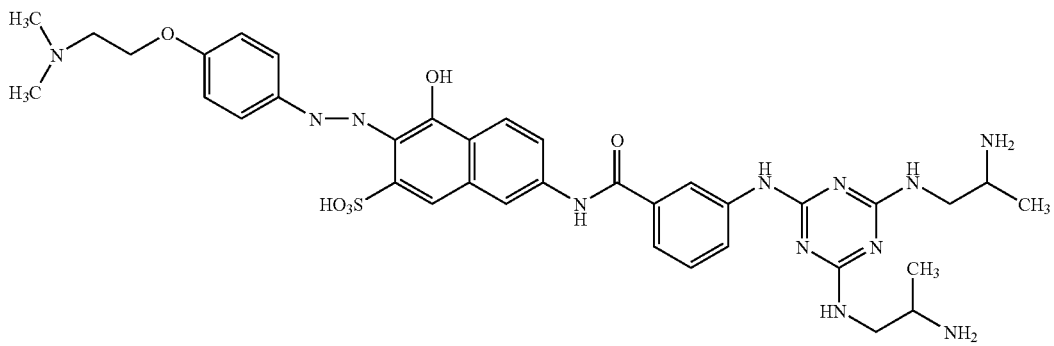

TABLE 4

(Examples 182–202)
In an analogous manner as described in Example 181 using the appropriate starting material, further compounds of formula (I) are produced. The compounds have the formula

| No. | DK | X | Shade |
|---|---|---|---|
| 182 | H₃C–N(CH₃)–CH₂CH₂–O–C₆H₄–* | *HN–CH₂CH₂CH₂–N(CH₂CH₃)₂ | red |
| 183 | piperidine–CH₂CH₂–O–C₆H₄–* | *HN–CH₂–CH(CH₃)–NH₂ | red |
| 184 | piperidine–CH₂CH₂–O–C₆H₄–* | *HN–CH₂CH₂CH₂–N(CH₂CH₃)₂ | red |
| 185 | pyrrolidine–CH₂CH₂–O–C₆H₄–* | *HN–CH₂–CH(CH₃)–NH₂ | red |
| 186 | pyrrolidine–CH₂CH₂–O–C₆H₄–* | *HN–CH₂CH₂CH₂–N(CH₂CH₃)₂ | red |
| 187 | morpholine–CH₂CH₂–O–C₆H₄–* | *HN–CH₂–CH(CH₃)–NH₂ | red |
| 188 | morpholine–CH₂CH₂–O–C₆H₄–* | *HN–CH₂CH₂CH₂–N(CH₂CH₃)₂ | red |

TABLE 4-continued (Examples 182–202)
In an analogous manner as described in Example 181 using the appropriate starting material, further compounds of formula (I) are produced. The compounds have the formula

| No. | DK | X | Shade |
|-----|----|----|-------|
| 189 | HO-CH₂CH₂-N(CH₂CH₂-OH)-CH₂CH₂-O-C₆H₄-* | *HN-CH₂-CH(CH₃)-NH₂ | red |
| 190 | HO-CH₂CH₂-N(CH₂CH₂-OH)-CH₂CH₂-O-C₆H₄-* | *HN-CH₂CH₂CH₂-N(CH₂CH₃)₂ | red |
| 191 | benzimidazol-2(3H)-one-5-yl* | *HN-CH₂-CH(CH₃)-NH₂ | red |
| 192 | benzimidazol-2(3H)-one-5-yl* | *HN-CH₂CH₂CH₂-N(CH₂CH₃)₂ | red |
| 193 | 3-methoxy-(2-hydroxyethylsulfonyl)phenyl* | *HN-CH₂-CH(CH₃)-NH₂ | redish orange |
| 194 | 3-methoxy-(2-hydroxyethylsulfonyl)phenyl* | *HN-CH₂CH₂CH₂-N(CH₂CH₃)₂ | redish orange |
| 195 | 5-methoxy-2-methyl-(2-hydroxyethylsulfonyl)phenyl* | *HN-CH₂-CH(CH₃)-NH₂ | red |

TABLE 4-continued (Examples 182–202)
In an analogous manner as described in Example 181 using the appropriate starting material, further compounds of formula (I) are produced. The compounds have the formula

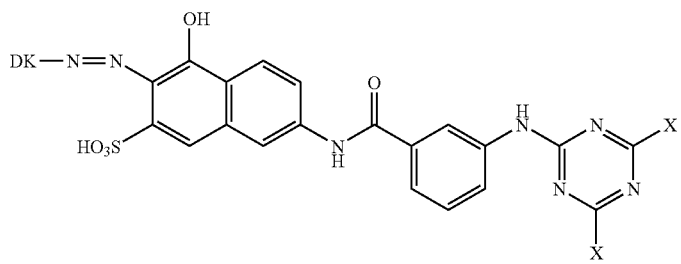

| No. | DK | X | Shade |
|---|---|---|---|
| 196 | 5-methoxy-2-(2-hydroxyethylsulfonyl)-4-methylphenyl | *HN-CH₂CH₂CH₂-N(C₂H₅)₂ | red |
| 197 | 2-(2-oxo-2-piperidin-1-yl-ethoxy)phenyl | *HN-CH₂-CH(CH₃)-NH₂ | red |
| 198 | 4-(dimethylaminomethyl)phenyl | *HN-CH₂-CH(CH₃)-NH₂ | orange |
| 199 | 4-(2-hydroxyethoxy)phenyl | *HN-CH₂-CH(CH₃)-NH₂ | red |
| 200 | 4-(2-hydroxyethoxy)phenyl | *HN-CH₂CH₂CH₂-N(C₂H₅)₂ | red |
| 201 | 4-(3-dimethylaminopropoxy)phenyl | *HN-CH₂-CH(CH₃)-NH₂ | red |
| 202 | 4-(3-dimethylaminopropoxy)phenyl | *HN-CH₂CH₂CH₂-N(C₂H₅)₂ | red |

TABLE 5

(Examples 203–212)
In an analogous manner as described in 181 using the appropriate starting material, further compounds of formula (I) are produced. The compounds have the formula

| No. | DK | X₁ | X₂ | Shade |
|---|---|---|---|---|
| 203 | N,N-dimethylaminoethoxyphenyl | *HN-propyl-N(Et)(Et) with CH₃ groups | *HN-CH(CH₃)-CH₂-NH₂ | red |
| 204 | piperidinoethoxyphenyl | *HN-propyl-N(Et)(Et) | *HN-CH(CH₃)-CH₂-NH₂ | red |
| 205 | pyrrolidinoethoxyphenyl | *HN-propyl-N(Et)(Et) | *HN-CH(CH₃)-CH₂-NH₂ | red |
| 206 | morpholinoethoxyphenyl | *HN-propyl-N(Et)(Et) | *HN-CH(CH₃)-CH₂-NH₂ | red |
| 207 | N,N-dimethylaminopropoxyphenyl | *HN-propyl-N(Et)(Et) | *HN-CH(CH₃)-CH₂-NH₂ | red |
| 208 | N,N-bis(2-hydroxyethyl)aminoethoxyphenyl | *HN-propyl-N(Et)(Et) | *HN-CH(CH₃)-CH₂-NH₂ | red |
| 209 | 2-oxo-benzimidazolyl | *HN-propyl-N(Et)(Et) | *HN-CH(CH₃)-CH₂-NH₂ | blueish red |
| 210 | 3-methoxy-4-(2-hydroxyethylsulfonyl)phenyl | *HN-propyl-N(Et)(Et) | *HN-CH(CH₃)-CH₂-NH₂ | scarlet |

TABLE 5-continued (Examples 203–212)
In an analogous manner as described in 181 using the appropriate starting
material, further compounds of formula (I) are produced. The compounds have the
formula

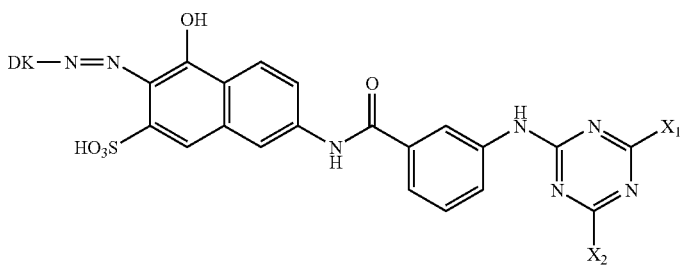

| No. | DK | X₁ | X₂ | Shade |
| --- | --- | --- | --- | --- |
| 211 | (structure: HO-CH₂-CH₂-SO₂- phenyl with O-CH₃ and H₃C substituents) | *HN-CH₂CH₂CH₂-N(CH₃)(CH₃) | *HN-CH(CH₃)-NH₂ | red |
| 212 | HO-CH₂-CH₂-O-phenyl* | *HN-CH₂CH₂CH₂-N(CH₃)(CH₃) | *HN-CH(CH₃)-NH₂ | red |

APPLICATION EXAMPLE A 70 parts chemically bleached sulphite cellulose obtained from pinewood and 30 parts chemically bleached cellulose obtained from birchwood are beaten in 2000 parts water in a Hollander. 0.2 parts of the dyestuff of Example 1a are sprinkled into this pulp. After mixing for 10 min, paper is produced from this pulp. The absorbent paper obtained in this way is dyed a brilliant scarlet red. The wastewater is colorless.

APPLICATION EXAMPLE B 0.2 parts of the dyestuff powder according to Example 1a, were dissolved in 100 parts hot water and cooled to room temperature. The solution is added to 100 parts chemically bleached sulphite cellulose which have been ground with 2000 parts water in a Hollander. After 15 minutes thorough mixing resin size and aluminium sulphate are added thereto. Paper produced in this way has a brilliant scarlet red nuance and exhibits perfect light and wet fastness.

APPLICATION EXAMPLE C

An absorbent length of unsized paper is drawn at 40–50° C. through a dyestuff solution having the following composition:

0.3 parts of the dyestuff according to Example 1a
0.5 parts of starch and
99.0 parts of water.

The excess dyestuff solution is squeezed out through two rollers. The dried length of paper is dyed a brilliant scarlet red shade.

The dyestuffs of Examples 2 to 212 as well as mixtures of Examples 1a–212 may also be used for dyeing by a method analogous to that of Application Examples A to C. The paper dyeings obtained show good fastness properties.

APPLICATION EXAMPLE D 0.2 Parts of the dyestuff of Example 1a in acid addition salt form are dissolved in 4000 part of demineralised water at 40° C. 100 Parts of a pre-wetted cotton textile substrate are added, and the bath is raised to the boiling point over 30 minutes and held at the boil for one hour. Any water, which evaporates during dyeing, is replaced continuously. The dyed substrate is removed form the bath, and after rinsing and drying, a brilliant scarlet red dyeing is obtained having good light-and wet-fastness properties. The dyestuff exhausts practically totally onto the fiber, and the wastewater is almost colorless.

In a similar manner as described in Application Example D the dyestuffs according to Examples 2–212 as well as mixtures of Examples 1a–212 may be used for dyeing cotton.

APPLICATION EXAMPLE E 100 parts freshly tanned and neutralized chrome leather are agitated for 30 minutes in a vessel with a liquor consisting of 250 parts of water at 55° C. and 0.5 parts of the dyestuff of Example 1a in acid addition salt form, and then treated in the same bath for 30 minutes with 2 parts of an anionic fatty liquor based on sulphonated train oil. The leather is then dried and prepared in the normal way, giving a leather evenly dyed in a brilliant scarlet red shade.

By a method analogous to that described in Application Example E the dyestuffs according to Examples 2–212 may be used for dyeing leather.

Further vegetable-tanned leathers of low affinity may be dyed using the dyestuffs as described herein in accordance with known methods.

APPLICATION EXAMPLE F

Water is added to a dry pulp in Hollander consisting of 60% (by weight) of mechanical wood pulp and 40% (by weight) of unbleached sulphite cellulose, and the slurry is beaten in order to obtain a dry content slightly exceeding 2.5% and having a beating degree of 40° SR (degrees Schopper-Riegler). The slurry is then exactly adjusted to a high density dry content of 2.5% by adding water. 5 Parts of a 2.5% aqueous solution of the dyestuff according to Example 1a are added to 200 parts of the above resulting slurry. The mixture is stirred for about 5 minutes and, after the addition of 2% (by weight) resin size and then 4% (by weight) alum (based on the dry weight) is further stirred for a few minutes until homogeneous. The resulting pulp is diluted with about 500 parts water to a volume of 700 parts and then used for the production of paper sheets by suction on a sheet former. The resulting paper sheets are dyed a brilliant scarlet red.

By a method analogous to that described in Application Example F any one of the dyestuffs of Examples 2–212 as well as mixtures of Examples 1a–212 may be used instead of that of Example 1a. In all cases, the waste paper exhibits a substantially low residual dye concentration.

APPLICATION EXAMPLE G

Water is added to a dry pulp in a Hollander consisting of 50% (by weight) of chemically bleached sulphite cellulose obtained from pinewood and 50% (by weight) of chemically bleached sulphite cellulose obtained from birchwood, and the slurry is ground until a degree of grinding of 35° SR is reached. The slurry is then adjusted to a high density dry content of 2.5% by adding water, and the pH of this suspension is adjusted to 7.10 Parts of a 0.5% aqueous solution of the dyestuff according to Example 1a are added to 200 parts of the above resulting slurry, and the mixture is stirred for 5 minutes. The resulting pulp is diluted with 500 parts water and then used for the production of sheets by suction on a sheet former. The paper sheets thus obtained have a brilliant scarlet red.

By a method analogous to that described in Application Example G further dye mixtures may be used consisting of any one of the dyestuffs of Examples 2–212. In all cases, paper sheets are formed having a brilliant scarlet red shade.

APPLICATION EXAMPLE H 12.6 parts dyestuff of Example 1 are added dropwise at room temperature to a stirred mixture of 20.0 parts diethyleneglycole and 67.4 parts of demineralized water. The resulting ink exhibits good light- and waterfastness properties. In a similar manner as described in Application Example H all the Examples of Table 1 and Table 2 and Table 3 and Table 4 and Table 5 may be used.

The invention claimed is:
1. Compounds of formula (I)

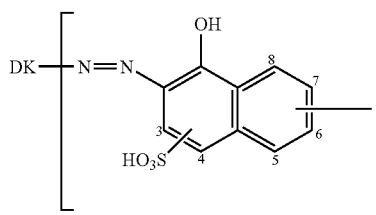

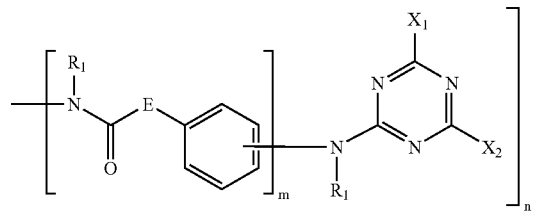

wherein
$R_1$ is H; $C_1$–$C_4$alkyl or $C_1$–$C_4$alkyl monosubstituted by —OH,
$X_1$ and $X_2$ independently of each other are an aliphatic, cycloaliphatic, aromatic or heterocyclic amino group, and at least one amino group comprises a protonatable nitrogen atom or a quaternary ammonium group, and being an aliphatic, cycloaliphatic, aromatic or heterocyclic mono($C_{1-4}$alkyl)-amino group, the $C_{1-4}$alkyl-group being unsubstituted or monosubstituted by halogen, $C_{1-4}$alkoxy, $C_{1-4}$alkyl, phenyl or hydroxy; an aliphatic, cycloaliphatic, aromatic or heterocyclic di($C_{1-4}$alkyl)-amino group, the $C_{1-4}$alkyl-groups being independently unsubstituted or monosubstituted by halogen, $C_{1-4}$alkyl, $C_{1-4}$alkoxy, phenyl or hydroxy; a $C_{5-6}$cycloalkylamino group, the cycloalkyl group being unsubstituted or substituted by one or two $C_{1-2}$alkyl groups; a phenylamino group, the phenyl ring being unsubstituted or substituted by one or two groups selected from halogen, $C_{1-4}$alkyl, $C_{1-4}$alkoxy, hydroxy and phenoxy; or a 5- or 6-membered ring containing one or two hetero atoms, in addition to N, O or S, which heterocyclic ring is unsubstittited or substituted by one or two $C_{1-4}$alkyl groups; or a group Z, where Z is Independently selected from

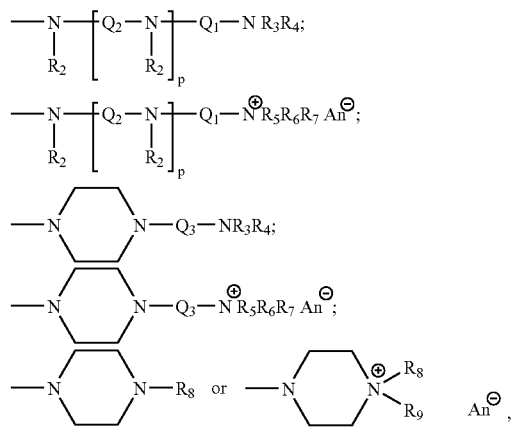

where
p is 0 or an integer 1, 2, or 3,
each $R_2$ is independently H; unsubstituted $C_{1-4}$alkyl or $C_{1-4}$alkyl monosubstituted by hydroxy, halogen, cyano or $C_{1-4}$alkoxy,
each $R_3$ and $R_4$ is independently H; unsubstituted $C_{1-6}$alkyl; $C_{2-6}$alkyl monosubstituted by hydroxy or cyano; phenyl or phenyl-$C_{1-4}$alkyl, where the phenyl ring of the latter two groups is unsubstituted or substituted by one to three groups selected from chlorine, $C_{1-4}$alkyl, $C_{1-4}$alkoxy, unsubstituted $C_{5-6}$cycloalkyl or $C_{5-6}$cycloalkyl substituted by one to three $C_{1-4}$alkyl groups, or a pyridinium ring, or $R_3$ and $R_4$ together with the nitrogen atom to which they are attached, form a 5- or 6-membered ring containing one to three hetero atoms (in addition to N, one or two further N, O or S), which heterocyclic ring is unsubstituted or substituted by one or two $C_{1-4}$alkyl groups, each $R_5$ and $R_6$ has independently one of the groups as defined in $R_3$ and $R_4$, except hydrogen, $R_7$ is $C_{1-4}$alkyl or benzyl with the exception that $R_7$ is not benzyl when $R_5$ and $R_6$ have one of the cyclic groups as defined in $R_3$ and $R_4$ or $R_5$, $R_6$ and $R_7$ together with the nitrogen atom to which they are attached, form a pyridinium ring which is unsubstituted or substituted by one or two methyl groups, $Q_1$ is $C_{2-6}$alkylene; branched $C_{2-8}$alkylene; $C_{2-6}$alkylene substituted by one or two hydroxy groups; $C_{1-6}$alkylene-1,3-phenylene; or $C_{1-6}$alkylene-1,4-phenylene, $Q_2$ is $C_{2-8}$alkylene; branched $C_{2-8}$alkylene; $C_{3-6}$alkylene substituted by one or two hydroxy groups; $C_{1-6}$alkylene-1,3-phenylene; $C_{1-6}$alkylene-1,4-phenylene; 1,3-phenylene or 1,4-phenylene, $Q_3$ is $C_{2-8}$alkylene, $R_8$ is H; unsubstituted $C_{1-6}$alkyl or $C_{1-6}$alkyl monosubstituted by hydroxy, cyano, chlorine or phenyl, $R_9$ is unsubstituted $C_{1-6}$alkyl or $C_{1-6}$alkyl monosubstituted by hydroxy, cyano or chlorine, and $An^\ominus$ is a non-chromophoric anion, E is NH or a direct bond, m is 0 or 1, and if m is 1 the phenyl group is substituted meta or para, and DK is a radical of formula (a)

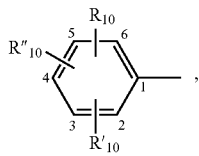
(a)

wherein $R_{10}$ is $SO_2$—Y or —O—Y, where Y is a $C_{2-4}$-alkenyl group or a $C_{2-4}$alkyl group which is substituted by —CN, —OH, —$OSO_3H$, halogen or —$NR_{11}R_{12}$, wherein $R_{11}$ and $R_{12}$ are independently from one another H, $C_{1-4}$alkyl or substituted $C_{1-4}$alkyl, or $R_{11}$ and $R_{12}$ together with the nitrogen atom to which they are attached, form a 5- or 6-membered ring containing one to three hetero atoms (in addition to N, one or two further N, O or S), which heterocyclic ring is unsubstituted or substituted, $R'_{10}$ and $R''_{10}$ are independently from one another H; $C_{1-2}$alkyl; $OC_{1-2}$alkyl; —$SO_3H$; —OH or —CN;

as well as their salts and/or mixtures thereof.

2. A compound according to claim 1 where the substituted triazinyl radical is attached to the naphthol radical at the 6 or 7 position.

3. A compound according to claim 1 where $R_1$ is a $R_{1a}$ where each $R_{1a}$ is independently H; methyl; ethyl or 2-hydroxyethyl.

4. A compound according to claim 1 where $X_1$ and $X_2$ are independently from each other mono($C_{1-4}$alkyl) amino-radical; a di($C_{1-4}$alkyl) amino radical; a mono($C_{1-4}$alkyl)- or di($C_{1-4}$alkyl)-amino group in which each alkyl group is independently monosubstituted by halogen, $C_{1-4}$alkoxy, phenyl or hydroxy; $C_{5-6}$cycloalkyl-amino group; $C_{5-6}$cycloalkyl-amino group in which the cycloalkyl group is substituted by one or two $C_{1-2}$alkyl groups; a phenylamino group; a phenylamino group in which the phenyl ring is substituted by one or two groups selected from halogen, $C_{1-4}$alkyl, $C_{1-4}$alkoxy, hydroxy and phenoxy; a saturated 5- or 6-membered ring containing one or two hetero atoms; a saturated 5- or 6-membered ring containing one or two hetero atoms which heterocyclic ring is substituted by one or two $C_{1-4}$alkyl groups.

5. A compound according to claim 1 where Z has the meaning $Z_a$, wherein each $Z_a$ is independently a group selected from

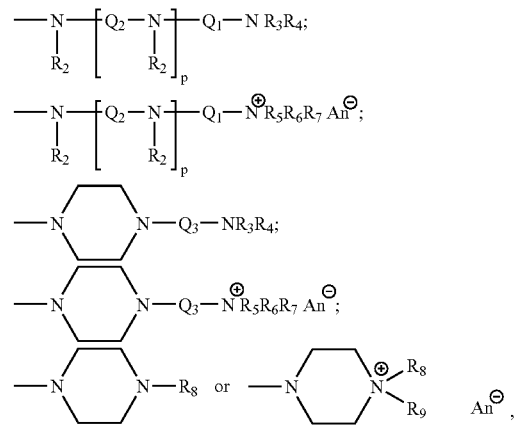

in which p' is 0 or 1, $R_{2b}$ is H: methyl or 2-hydroxyethyl, $Q_{1b}$ is unsubstituted $C_{2-8}$alkylene; monohydroxy-substituted $C_{3-4}$alkylene; —$(CH_2)_{1-4}$-1,3-phenylene; —$(CH_2)_{1-4}$-1,4-phenylene; 1,3-phenylene or 1,4-phenylene, each $R_{2b}$ and $Q_{3b}$ is a linear $C_{2-6}$alkylene group, each $R_{3b}$ and $R_{4b}$ is independently H; unsubstituted $C_{1-4}$alkyl or 2-hydroxy-ethyl, or a pyridinium ring, each $R_{5b}$ and $R_{6b}$ is independently unsubstituted $C_{1-4}$alkyl or 2-hydroxy-ethyl, $R_{7b}$ is $C_{1-4}$alkyl or benzyl or $R_{5b}$, $R_{6b}$ and $R_{7b}$ together with the nitrogen to which they are attached form a pyridinium ring which is unsubstituted or substituted by one or two methyl groups, $R_{8b}$ is H; methyl; ethyl or 2-hydroxyethyl, $R_{9b}$ is methyl; ethyl or 2-hydroxyethyl, $R_{10}$ is in position 4, and $An^\ominus$ is a non-chromophoric anion.

6. A compound according to claim 1, where n is 1 and DK is a radical of formula (a) wherein $R_{10}$ is $SO_2Y$ or —O—Y wherein Y is a $C_{2-4}$alkyl group which is substituted by —Cl, —OH or —$OSO_3H$, $R'_{10}$ and $R''_{10}$ are independently from one another H; $C_{1-2}$alkyl or $OC_{1-2}$alkyl, $R_{11}$ and $R_{12}$ independently from each other are H; —$CH_3$ or —$CH_2CH_3$;

$R_{13}$ is H: —$CH_3$ or —$OCH_3$, $R_{14}$ and $R_{15}$ independently from each other are —$CH_3$; —$CH_2CH_3$; —$OCH_3$; —$OCH_2CH_3$ or —$SO_3H$, $R_{16}$, $R_{17}$ and $R_{18}$ are independently from each other H; —$NH_2$; —OH; or —$SO_3H$, $R_{19}$ and $R_{20}$ are independently from each other H; —$CH_3$; halogen; $C_{1-2}$alkyl; or —$OCH_3$, $R_{21}$ and $R_{22}$ are independently from each other H; —$CH_3$ or —$CH_2CH_3$, $R_{23}$ is H; —$CH_3$ or —$CH_2CH_3$, $R_{24}$ is H; —$CH_3$ or —$OCH_3$, $R_{25}$ and $R_{26}$ are independently from each other H; —$CH_3$ or —$CH_2CH_3$.

7. A compound according to claim 1, where DK is a radical of formula (a), wherein at the $R_{10}$ position, the heterocyclic ring formed by $R_{11}$, $R_{12}$, and the nitrogen atom to which they are attached is substituted by one or two $C_{1-4}$alkyl groups.

* * * * *